US 9,354,070 B2

United States Patent
Thomson et al.

(10) Patent No.: US 9,354,070 B2
(45) Date of Patent: May 31, 2016

(54) SYSTEMS, METHODS, AND INDUSTRIAL VEHICLES FOR DETERMINING THE VISIBILITY OF FEATURES

(71) Applicant: Crown Equipment Limited, East Tamaki, Auckland (NZ)

(72) Inventors: Jacob Jay Thomson, Auckland (NZ); Lisa Wong, Auckland (NZ); Timothy William Fanselow, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 14/525,724

(22) Filed: Oct. 28, 2014

(65) Prior Publication Data
US 2015/0120125 A1 Apr. 30, 2015

Related U.S. Application Data

(60) Provisional application No. 61/897,867, filed on Oct. 31, 2013.

(51) Int. Cl.
| | |
|---|---|
| *G05D 1/02* | (2006.01) |
| *G01C 21/34* | (2006.01) |
| *B66F 9/06* | (2006.01) |
| *B66F 9/075* | (2006.01) |

(52) U.S. Cl.
CPC ............ *G01C 21/3407* (2013.01); *B66F 9/063* (2013.01); *B66F 9/0755* (2013.01); *G05D 1/024* (2013.01); *G05D 1/0274* (2013.01); *G05D 2201/0216* (2013.01)

(58) Field of Classification Search
CPC combination set(s) only.
See application file for complete search history.

(56) References Cited

U.S. PATENT DOCUMENTS

| | | |
|---|---|---|
| 5,806,016 A | 9/1998 | Henderson et al. |
| 6,182,008 B1 | 1/2001 | Nikiel et al. |
| 6,269,291 B1 | 7/2001 | Segeren |
| 6,377,888 B1 | 4/2002 | Olch |

(Continued)

FOREIGN PATENT DOCUMENTS

| | | |
|---|---|---|
| AT | 243861 T | 7/2003 |
| AT | 522788 T | 9/2011 |

(Continued)

OTHER PUBLICATIONS

Fredrik Arnesson, Freedom to Operate Search Report, Reference No. 187801, PRV InterPat, Stockholm Sweden.

(Continued)

*Primary Examiner* — Edward Pipala
(74) *Attorney, Agent, or Firm* — Dinsmore & Shohl LLP

(57) ABSTRACT

According to the embodiments described herein, an industrial vehicle can include an Environmental Based Localization (EBL) sensor communicatively coupled to one or more processors. The EBL sensor can detect objects within a field of view. The one or more processors execute machine readable instructions to access a feature set and an occlusion set that are associated with an industrial facility. An occlusion path that intersects a detectable occlusion of the occlusion set and the sensor origin of the EBL sensor can be determined. A feature intersection of the occlusion path can be determined. A detectable feature can be classified as an occluded detectable feature based at least in part upon location of the feature intersection. The industrial vehicle can be navigated through the industrial facility utilizing the feature set exclusive of the occluded detectable feature.

18 Claims, 18 Drawing Sheets

(56) References Cited

U.S. PATENT DOCUMENTS

| | | |
|---|---|---|
| 6,459,966 B2 | 10/2002 | Nakano et al. |
| 6,539,294 B1 | 3/2003 | Kageyama |
| 6,799,099 B2 | 9/2004 | Zeitler et al. |
| 6,900,762 B2 | 5/2005 | Andrews et al. |
| 6,941,191 B2 | 9/2005 | Jaeger |
| 6,963,301 B2 | 11/2005 | Schantz et al. |
| 7,010,425 B2 | 3/2006 | Gray et al. |
| 7,038,573 B2 | 5/2006 | Bann |
| 7,079,943 B2 | 7/2006 | Flann et al. |
| 7,151,979 B2 | 12/2006 | Andersen et al. |
| 7,251,548 B2 | 7/2007 | Herz et al. |
| 7,307,595 B2 | 12/2007 | Schantz et al. |
| 7,512,485 B2 | 3/2009 | Hudson, Jr. et al. |
| 7,609,175 B2 | 10/2009 | Porte et al. |
| 7,613,617 B2 | 11/2009 | Williams et al. |
| 7,634,332 B2 | 12/2009 | Williams et al. |
| 7,734,385 B2 | 6/2010 | Yang et al. |
| 7,755,552 B2 | 7/2010 | Schantz et al. |
| 7,761,210 B2 | 7/2010 | Baginski et al. |
| 7,800,548 B2 | 9/2010 | Baginski et al. |
| 7,818,088 B2 | 10/2010 | Andersen et al. |
| 7,844,364 B2 | 11/2010 | McLurkin et al. |
| 7,845,560 B2 | 12/2010 | Emanuel et al. |
| 7,873,469 B2 | 1/2011 | D'Andrea et al. |
| 7,894,939 B2 | 2/2011 | Zini et al. |
| 7,919,940 B2 | 4/2011 | Miller et al. |
| 7,920,962 B2 | 4/2011 | D'Andrea et al. |
| 7,925,514 B2 | 4/2011 | Williams et al. |
| 7,979,172 B2 | 7/2011 | Breed |
| 7,979,173 B2 | 7/2011 | Breed |
| 7,991,521 B2 | 8/2011 | Stewart |
| 8,019,475 B2 | 9/2011 | Kuroda |
| 8,019,531 B2 | 9/2011 | Pinkus et al. |
| 8,024,069 B2 | 9/2011 | Miller et al. |
| 8,050,800 B2 | 11/2011 | Miller et al. |
| 8,055,583 B2 | 11/2011 | Yoshizawa |
| 8,068,978 B2 | 11/2011 | D'Andrea et al. |
| 8,103,383 B2 | 1/2012 | Nakamura |
| 8,150,650 B2 | 4/2012 | Goncalves et al. |
| 8,196,835 B2 | 6/2012 | Emanuel et al. |
| 8,204,679 B2 | 6/2012 | Nakamura |
| 8,210,435 B2 | 7/2012 | Mahan et al. |
| 8,220,710 B2 | 7/2012 | Hoffman et al. |
| 8,253,626 B2 | 8/2012 | Schantz et al. |
| 8,255,107 B2 | 8/2012 | Yang et al. |
| 8,265,873 B2 | 9/2012 | D'Andrea et al. |
| 8,280,623 B2 | 10/2012 | Trepagnier et al. |
| 8,295,974 B2 | 10/2012 | Andersen et al. |
| 8,346,468 B2 | 1/2013 | Emanuel et al. |
| 8,381,982 B2 | 2/2013 | Kunzig et al. |
| 8,385,594 B2 | 2/2013 | Hofmann et al. |
| 8,457,978 B2 | 6/2013 | Williams et al. |
| 8,488,880 B2 | 7/2013 | Boncyk et al. |
| 8,508,590 B2 | 8/2013 | Laws et al. |
| 8,538,577 B2 | 9/2013 | Bell et al. |
| 8,538,692 B2 | 9/2013 | Wurman et al. |
| 8,548,671 B2 | 10/2013 | Wong et al. |
| 8,587,455 B2 | 11/2013 | Porte et al. |
| 8,589,012 B2 | 11/2013 | Wong et al. |
| 8,594,923 B2 | 11/2013 | Wong et al. |
| 8,643,538 B2 | 2/2014 | Schantz et al. |
| 8,648,709 B2 | 2/2014 | Gauger et al. |
| 8,655,588 B2 | 2/2014 | Wong et al. |
| 2009/0062974 A1* | 3/2009 | Tamamoto ........... G05D 1/0295 701/25 |
| 2010/0063954 A1 | 3/2010 | Anderson |
| 2011/0128163 A1 | 6/2011 | Gilleland et al. |
| 2012/0123614 A1 | 5/2012 | Laws et al. |
| 2012/0303176 A1 | 11/2012 | Wong et al. |
| 2012/0303255 A1 | 11/2012 | Wong et al. |
| 2012/0310468 A1 | 12/2012 | Wong et al. |
| 2012/0323431 A1 | 12/2012 | Wong et al. |
| 2012/0323432 A1 | 12/2012 | Wong et al. |
| 2013/0054129 A1 | 2/2013 | Wong et al. |
| 2013/0060461 A1 | 3/2013 | Wong et al. |
| 2014/0032035 A1 | 1/2014 | Thomson |
| 2014/0058612 A1 | 2/2014 | Wong et al. |
| 2014/0058634 A1 | 2/2014 | Wong et al. |
| 2014/0074342 A1 | 3/2014 | Wong et al. |
| 2014/0214258 A1 | 7/2014 | Wong et al. |

FOREIGN PATENT DOCUMENTS

| | | |
|---|---|---|
| AT | 552477 T | 4/2012 |
| AU | 8752398 A | 2/1999 |
| AU | 738666 B2 | 9/2001 |
| CA | 298534 A | 3/1930 |
| CA | 2654260 A1 | 12/2007 |
| DE | 69815863 T2 | 5/2004 |
| DE | 202007012798 U1 | 2/2009 |
| DE | 102007043498 A1 | 3/2009 |
| EP | 0901056 A1 | 3/1999 |
| EP | 1010046 A1 | 6/2000 |
| EP | 1537439 A2 | 6/2005 |
| EP | 1767488 A2 | 3/2007 |
| EP | 1842824 A2 | 10/2007 |
| EP | 2008060 A2 | 12/2008 |
| EP | 2014606 A1 | 1/2009 |
| EP | 2037224 A1 | 3/2009 |
| EP | 2037225 A1 | 3/2009 |
| EP | 2037226 A2 | 3/2009 |
| EP | 2037227 A1 | 3/2009 |
| EP | 2037228 A1 | 3/2009 |
| EP | 2037229 A1 | 3/2009 |
| EP | 2047376 A2 | 4/2009 |
| EP | 2169505 A2 | 3/2010 |
| EP | 2169507 A2 | 3/2010 |
| EP | 2235477 A1 | 10/2010 |
| EP | 2385435 A1 | 11/2011 |
| ES | 2202885 T3 | 4/2004 |
| ES | 2371118 T3 | 12/2011 |
| FR | 2926880 A1 | 7/2009 |
| JO | 3421768 B2 | 6/2003 |
| JP | 2001512259 A | 8/2001 |
| JP | 2001320616 A | 11/2001 |
| JP | 2009080807 A | 4/2009 |
| JP | 2009541176 A | 11/2009 |
| KR | 20100127244 A | 12/2010 |
| KR | 20110054623 A | 5/2011 |
| NL | 1006710 A1 | 2/1999 |
| WO | 9906898 A1 | 2/1999 |
| WO | 2004017087 A2 | 2/2004 |
| WO | 2007149703 A2 | 12/2007 |
| WO | 2009092812 A1 | 7/2009 |

OTHER PUBLICATIONS

Application pertaining to U.S. Appl. No. 14/499,721 filed Sep. 29, 2014.

Application pertaining to U.S. Appl. No. 14/488,654 filed Sep. 17, 2014.

Application pertaining to U.S. Appl. No. 14/488,659 filed Sep. 17, 2014.

Application pertaining to U.S. Appl. No. 14/488,660 filed Sep. 17, 2014.

Application pertaining to U.S. Appl. No. 14/499,700 filed Sep. 29, 2014.

Se, S., et al., "Vision-Based Mobile Robot Localization and Mapping Using Scale-Invariant Features", Proceeding of IEEE International Conference on Robotics and Automation (ICRA) Seoul, Korea, vol. 2, May 21-26, 2001, pp. 2051-2058.

Kelly, A., et al., "An Infrastructure-Free Automated Guided Vehicle Based on Computer Vision", IEEE Robotics & Automation Magazine, Sep. 2007, pp. 24-34.

International Search Report and Written Opinion dated Feb. 19, 2015 pertaining to International Application No. PCT/NZ2014/050007.

* cited by examiner

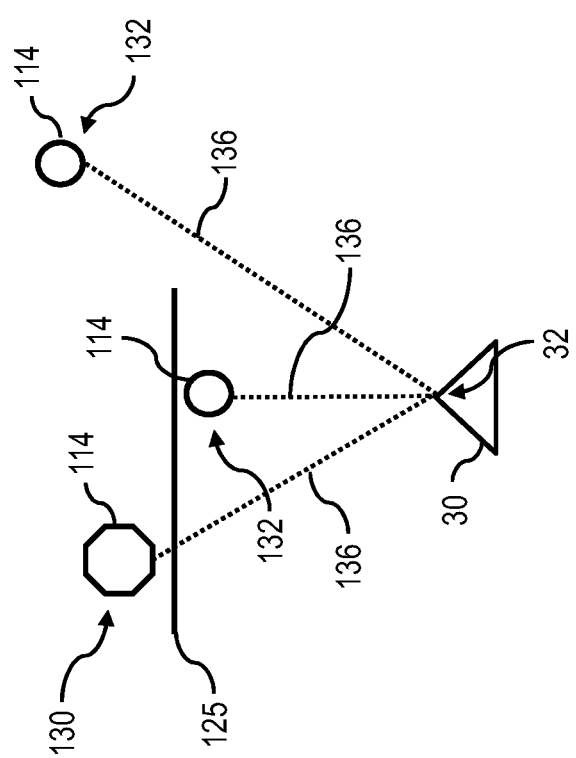

SYSTEMS, METHODS, AND INDUSTRIAL VEHICLES FOR DETERMINING THE VISIBILITY OF FEATURES

CROSS-REFERENCE TO RELATED APPLICATIONS

This application claims the benefit of U.S. Provisional Application No. 61/897,867 filed Oct. 31, 2013.

BACKGROUND

The present specification generally relates to systems, methods, and industrial vehicles for determining the visibility of features and, more specifically, to systems, methods, and industrial vehicles for utilizing visible features and excluding occluded features to navigate industrial vehicles.

Industrial vehicles, including for example, forklift trucks, hand and motor driven pallet trucks, and/or other materials handling vehicles, can be utilized in order to move items about an industrial environment. The industrial vehicles can be configured as an automated guided vehicle or a manually guided vehicle that navigates through the environment. In order to facilitate automated guidance, navigation, or both, the industrial vehicle may be adapted for localization within the environment such as, for example, pose and position of the industrial vehicle. Accordingly, the industrial vehicle can be adapted with sensors configured to detect features in the environment and processors for determining the location of the industrial vehicle using the detected features. However, the features can be occluded by objects that prevent the features from being detected by the sensor. The failure to detect the occluded features can cause the localization to fail, produce inaccurate results, and require increased processing time.

Accordingly, a need exists for alternative systems, methods, and industrial vehicles for determining the visibility of features.

SUMMARY

The present disclosure relates to systems, methods and devices for determining the visibility of features and has particular applicability to the navigation and localization of industrial vehicles and, more particularly, to lift trucks. In one embodiment, a method of determining visibility of features may include providing a feature set associated with a physical environment. An occlusion set can be provided. The occlusion set can be associated with the physical environment. A location of a sensor can be determined with respect to the physical environment. The sensor can have a detection range. A detectable feature set can be selected from the feature set. The detectable feature set can include a detectable feature associated with a feature position that is within the detection range from the location of the sensor. A detectable occlusion set can be selected from the occlusion set. The detectable occlusion set can include a detectable occlusion associated with an occlusion position that is within the detection range from the location of the sensor. An occlusion path can be determined. The occlusion path can intersect the detectable occlusion and a sensor origin of the sensor. A feature intersection of the occlusion path can be determined automatically with one or more processors. The feature intersection can be located on the detectable feature or a projection of the detectable feature. The detectable feature can be determined visible, automatically with one or more processors, based at least in part upon the feature intersection.

In one embodiment, an industrial vehicle can include an Environmental Based Localization (EBL) sensor communicatively coupled to one or more processors. The EBL sensor can detect objects within a field of view. The one or more processors can execute machine readable instructions to access a feature set and an occlusion set that are associated with an industrial facility. A location of a sensor origin of the EBL sensor can be provided with respect to the industrial facility. An occlusion path that intersects a detectable occlusion of the occlusion set and the sensor origin of the EBL sensor can be determined. A feature intersection of the occlusion path can be determined. The feature intersection can be located on a detectable feature of the feature set or a projection of the detectable feature of the feature set. The detectable feature can be classified as an occluded detectable feature based at least in part upon the location of the feature intersection. The industrial vehicle can be navigated through the industrial facility utilizing the feature set exclusive of the occluded detectable feature.

In another embodiment, a system for determining the visibility of features can include one or more processors and an industrial vehicle including an Environmental Based Localization (EBL) sensor communicatively coupled to the one or more processors. The EBL sensor can detect objects within a field of view. The one or more processors can execute machine readable instructions to access a feature set and an occlusion set that are associated with an industrial facility. A location of a sensor origin of the EBL sensor can be provided with respect to the industrial facility. An occlusion path that intersects a detectable occlusion of the occlusion set and the sensor origin of the EBL sensor can be determined. A feature intersection of the occlusion path can be determined. The feature intersection can be located on a detectable feature of the feature set or a projection of the detectable feature of the feature set. The detectable feature can be classified as an occluded detectable feature based at least in part upon the location of the feature intersection. The industrial vehicle can be navigated through the industrial facility utilizing the feature set exclusive of the occluded detectable feature.

In a further embodiment, a method for determining the visibility of features can be implemented by one or more processors executing machine readable to perform functions. The method can include accessing a feature set and an occlusion set that are associated with an industrial facility. A location of a sensor origin of the EBL sensor can be provided with respect to the industrial facility. An occlusion path that intersects a detectable occlusion of the occlusion set and the sensor origin of the EBL sensor can be determined. A feature intersection of the occlusion path can be determined. The feature intersection can be located on a detectable feature of the feature set or a projection of the detectable feature of the feature set. The detectable feature can be classified as an occluded detectable feature based at least in part upon the location of the feature intersection. The industrial vehicle can be navigated through the industrial facility utilizing the feature set exclusive of the occluded detectable feature.

According to any of the industrial vehicles, methods, or systems described herein the detectable feature of the feature set can correspond to a feature of the industrial facility that is within the field of view of the EBL sensor.

According to any of the industrial vehicles, methods, or systems described herein the detectable occlusion of the occlusion set corresponds to an occlusion of the industrial facility that is within the field of view of the EBL sensor. Alternatively or additionally, the occlusion of the industrial facility can truncate the field of view of the EBL sensor into a truncated field of view. The occluded detectable feature can correspond to a feature of the industrial facility that is within the field of view of the EBL sensor and outside of the truncated field of view of the EBL sensor.

According to any of the industrial vehicles, methods, or systems described herein the occlusion path can intersect the detectable occlusion of the occlusion set at a start point or an end point. The one or more processors can execute the machine readable instructions to determine an order of the feature intersection, the start point or the end point of the detectable occlusion, and the sensor origin of the EBL sensor along the occlusion path. The detectable feature can be classified as the occluded detectable feature based at least in part upon the order. Alternatively or additionally, the one or more processors execute the machine readable instructions to determine a feature path that intersects the detectable feature of the feature set and the sensor origin of the EBL sensor. An intersection between the feature path and the detectable occlusion of the occlusion set can be determined. The detectable feature can be classified as the occluded detectable feature based at least in part upon the intersection. Alternatively or additionally, the order can be determined prior to the intersection being determined.

According to any of the industrial vehicles, methods, or systems described herein the one or more processors execute the machine readable instructions to determine a first feature path that intersects a start point of the detectable feature of the feature set and the sensor origin of the EBL sensor. A second feature path that intersects an end point of the detectable feature of the feature set and the sensor origin of the EBL sensor can be determined. A point of the detectable occlusion can be determined as inside, when the point of the of the detectable occlusion is bounded by an area demarcated by the detectable feature of the feature set, the first feature path and the second feature path. The detectable feature can be classified as the occluded detectable feature based at least in part upon the point of the detectable occlusion being determined inside. Alternatively or additionally, the one or more processors can execute the machine readable instructions to determine an intersection between the first feature path and the detectable occlusion of the occlusion set. The detectable feature can be classified as the occluded detectable feature based at least in part upon the intersection. Alternatively or additionally, the point of the detectable occlusion can be determined inside prior to the intersection being determined. Alternatively or additionally, the intersection can be determined prior to the point of the detectable occlusion being determined inside. Alternatively or additionally, the point of the detectable occlusion can be a start point of the detectable occlusion, or an end point of the detectable occlusion. Alternatively or additionally, the occlusion path can intersect the detectable occlusion of the occlusion set at a start point or an end point. The one or more processors execute the machine readable instructions to determine an order of the feature intersection, the start point or the end point of the detectable occlusion, and the sensor origin of the EBL sensor along the occlusion path. The detectable feature can be classified as the occluded detectable feature based at least in part upon the order. Alternatively or additionally, the order can be determined prior to the point of the detectable occlusion being determined inside.

According to any of the industrial vehicles, methods, or systems described herein, the detectable feature can be classified as the occluded detectable feature according to occlusion calculations that are organized using a cost heuristic.

According to any of the industrial vehicles, methods, or systems described herein, the industrial vehicle can be configured as an automated guided vehicle.

According to any of the industrial vehicles, methods, or systems described herein, the industrial facility can be mapped to a two dimensional model.

According to any of the industrial vehicles, methods, or systems described herein, the EBL sensor can include multiple sensors.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 schematically depicts a method for performing occlusion calculations to classify the visibility of features according to one or more embodiments shown and described herein;

DETAILED DESCRIPTION

The embodiments described herein generally relate to Environmental Based Localization (EBL) techniques for navigation through a physical environment such as, for example, a warehouse facility. In some embodiments, an EBL sensor can be mounted to an industrial vehicle, a robot, or the like. Accordingly, the EBL sensor can detect objects in a physical environment and extract features from the objects. The EBL sensor can be communicatively coupled to a feature list and match the extracted features to features from the feature list to determine the position of the industrial vehicle (e.g., a lift truck, which may also be referred to as a forklift or a fork truck) with respect to the physical environment. For example, the feature list can be associated with the physical environment in a manner analogous to a map.

Figure 1:
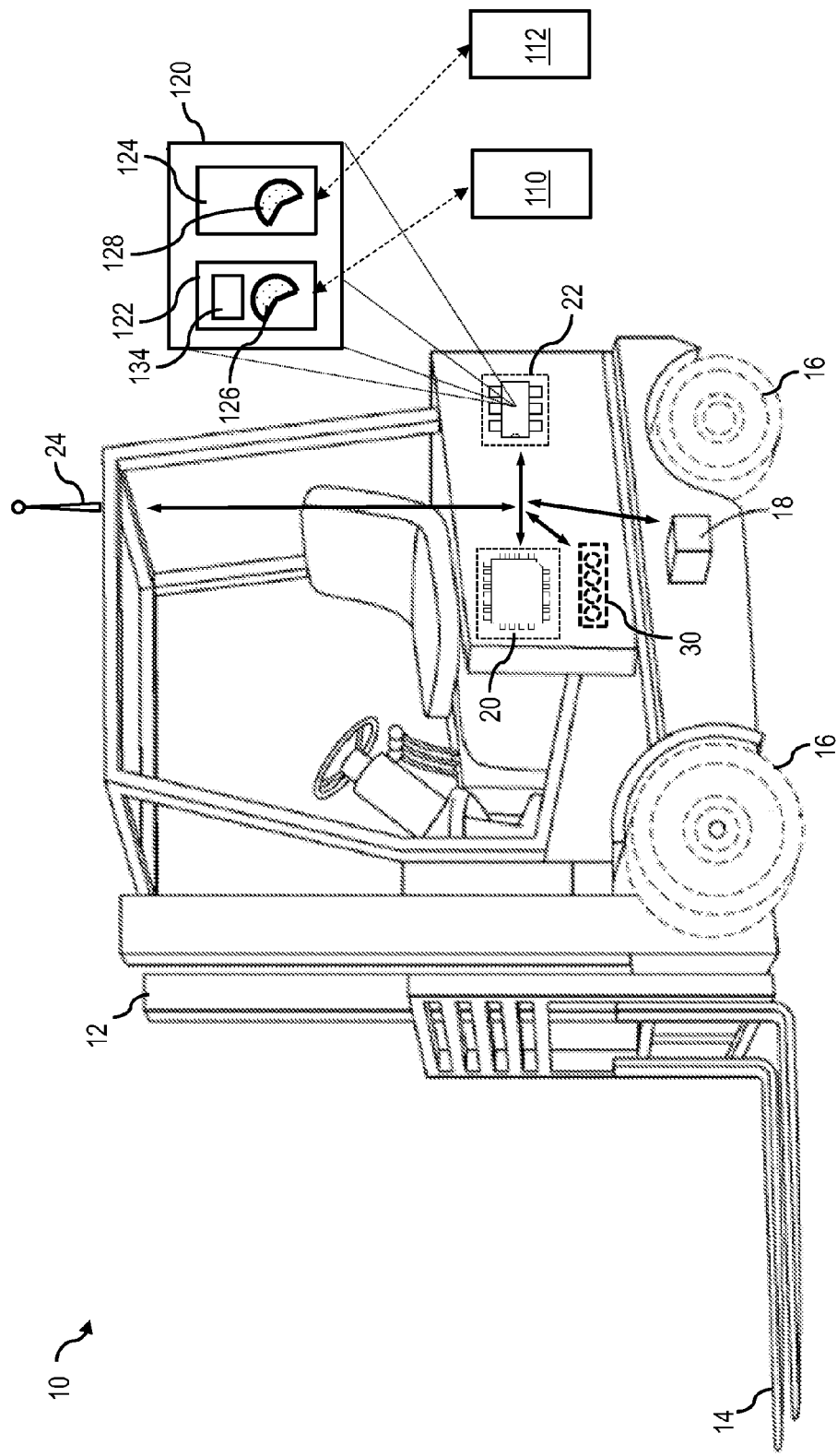
FIG. 1 schematically depicts an industrial vehicle according to one or more embodiments shown and described herein.

Referring to FIG. 1, an embodiment of an industrial vehicle 10 is schematically depicted. The industrial vehicle 10 can be any vehicle that is configured to determine localization information, i.e., information regarding the position of the industrial vehicle 10 with respect to an environment. The industrial vehicle 10 can be configured as a vehicle for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. Accordingly, the industrial vehicle 10 can comprise a mast 12 that extends in a substantially vertical direction and forks 14 operable to travel along the mast 12 to raise and lower in a substantially vertical direction. In some embodiments, the forks 14 can be configured to travel laterally to adjust the position of the forks 14 laterally with respect to the mast 12 or one another. Alternatively or additionally, the industrial vehicle 10 can comprise components for applying a clamping force to a payload (e.g., barrels, kegs, paper rolls and/or the like). The industrial vehicle 10 can further comprise one or more wheels 16 for traversing along a surface to travel along a desired path. Accordingly, the industrial vehicle 10 can be directed forwards and backwards by rotation of the one or more wheels 16. Additionally, the industrial vehicle 10 can be caused to change direction by steering the one or more wheels 16. A motive system 18 can be configured to apply force to actuate the forks 14, operate the wheels 16, or both. The motive system 18 can comprise a mechanical system, a hydraulic system, an electrical system, a pneumatic system or combinations thereof.

The industrial vehicle 10 can further comprise one or more processors 20 for executing machine readable instructions and memory 22 communicatively coupled to the one or more processors 20. For the purpose of defining and describing the present disclosure, it is noted that the term "processor" generally means a device that executes functions according to machine readable instructions or that has been configured to execute functions in a manner analogous to machine readable instructions such as, for example, an integrated circuit, a microchip, a computer, a central processing unit, a graphics processing unit, field-programmable gate array (FPGA), an application-specific integrated circuit (ASIC), or any other computation device. Additionally, it is noted that the term "memory" as used herein generally means one or more apparatus capable of storing data or machine readable instructions for later retrieval such as, but not limited to, RAM, ROM, flash memory, hard drives, or combinations thereof.

The one or more processors 20, memory 22, or both may be integral with the EBL sensor 30, the industrial vehicle 10, or both. However, it is noted that the one or more processors 20, memory 22, and the EBL sensor 30 may be discrete components communicatively coupled with one another without departing from the scope of the present disclosure. The phrase "communicatively coupled," as used herein, means that components are capable of exchanging signals with one another such as, for example, electrical signals via conductive medium, electromagnetic signals via air, optical signals via optical waveguides, or the like.

It is furthermore noted that the machine readable instructions described herein may comprise logic or algorithms written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as implemented via either an FPGA configuration or an ASIC, or their equivalents.

The industrial vehicle 10 can further comprise a communication circuit 24 for transmitting and receiving data signals. The communication circuit 24 can be communicatively coupled to the one or more processors 20, the memory 22, or both. The communication circuit 24 can include the necessary hardware to encode data and decode data for communication via a local area network, a personal area network, a cellular network, or the like. Accordingly, the industrial vehicle 10 can utilize the communication circuit 24 to communicate data via the Internet or World Wide Web.

The industrial vehicle 10 can further comprise an EBL sensor 30 for detecting features. The EBL sensor 30 can comprise one or more sensors each operable to collect environmental conditions surrounding the industrial vehicle 10, or the like. Accordingly, the EBL sensor 30 can comprise any sensor capable of detecting a quantity indicative of the environmental conditions surrounding the industrial vehicle 10 such as, for example, laser scanners, laser range finders, encoders, pressure transducers, cameras, radio frequency identification (RFID) detectors, optical detectors, cameras, ultrasonic range finders, or the like. It is noted that the term "sensor," as used herein, means one or more devices that measures a physical quantity and converts it into a signal, which is correlated to the measured value of the physical quantity. It is contemplated that a "signal" can be electrical, optical, magnetic, electromagnetic, or any other form capable of traveling through a medium. Contemplated signals include, but are not limited to, DC, AC, sinusoidal-wave, triangular-wave, square-wave, and the like.

The EBL sensor 30 can be mounted or physically attached at any location within or upon the industrial vehicle 10. Generally, the positioning of EBL sensor 30 is dependent upon the quantity being detected, i.e., the EBL sensor 30 can be advantageously positioned such that the quantity being detected is likely to be within the detection range, i.e., field of view 34 (FIG. 3), of the EBL sensor 30 during operation of the industrial vehicle 10. In some embodiments, the EBL sensor 30 can be communicatively coupled to the one or more processors 20, the memory 22, or both. Accordingly, the one or more processors 20 can receive sensor data from the EBL sensor 30. The sensor data can be processed by the EBL sensor 30 prior to transmission to the one or more processors 20. Alternatively or additionally, the sensor data can be processed by the one or more processors 20 after the sensor data is received.

The components of the industrial vehicle 10 can be communicatively coupled to the one or more processors 20 (generally indicated by arrows). Such components of the industrial vehicle 10 can be communicatively coupled via any wired or wireless bus that can comprise a controller area network (CAN) bus, ZigBee, Bluetooth, Local Interconnect Network (LIN), time-triggered data-bus protocol (TTP) or other suitable communication strategy. Accordingly, the one or more processors 20 of the industrial vehicle 10 can execute machine readable instructions to perform functions automatically. As a result, in some embodiments, the industrial vehicle 10 can be configured as an automated guided vehicle (AGV).

Figure 2:
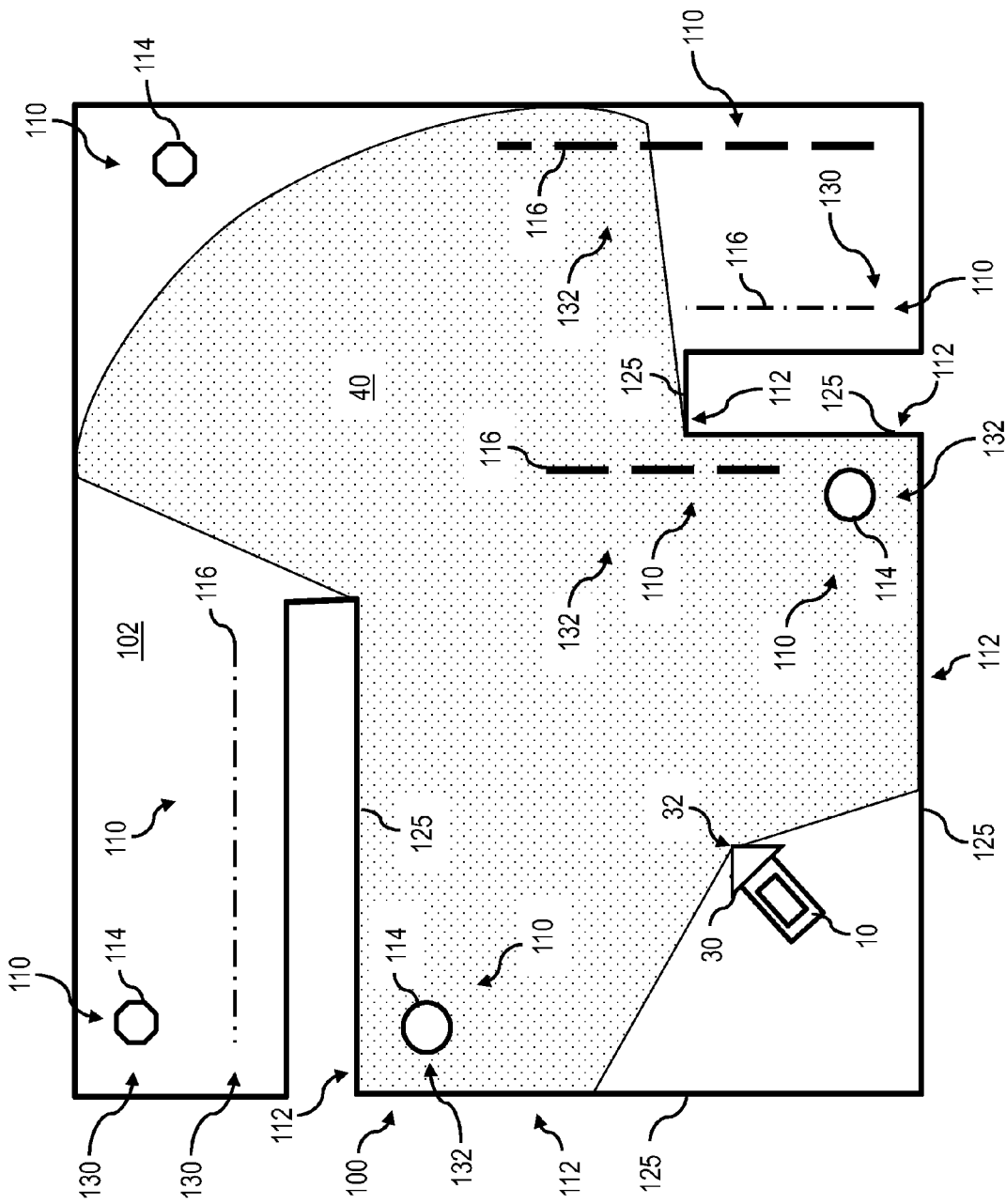
FIG. 2 schematically depicts a physical environment with visible and invisible features that is overlaid with map data according to one or more embodiments shown and described herein.

Referring collectively to FIGS. 1 and 2, the industrial vehicle 10 can be navigated automatically by the one or more processors 20 executing the machine readable instructions. In some embodiments, the location of the vehicle can be monitored by the EBL as the industrial vehicle 10 is navigated. For example, the industrial vehicle 10 can automatically navigate along a surface 102 of an industrial facility 100 such as, for example, a warehouse, a manufacturing facility, or any enclosure suitable for housing goods or payloads. It is noted that the term "surface" can be used herein to denote any expanse suitable for the operation of industrial vehicles 10.

To aid in navigation, the industrial vehicle 10 can determine the localized position of the industrial vehicle 10 with respect to the industrial facility 100. The determination of the localized position of the industrial vehicle 10 can be performed by comparing features 110 detected by the EBL sensor 30 to map data 120 having a corresponding feature set 122. The map data 120 can be stored locally in the memory 22, which can be updated periodically with data received via the communication circuit 24, or the map data 120 can be accessed via the communication circuit 24, i.e., the map data 120 can be provided by a server or the like. For example, the feature set 122 can be stored in memory 22 using data structures such as, for example, hierarchical data structures, tree structures (e.g., the feature set 122 can be inserted into a quad tree) or the like. Accordingly, the data structures can be utilized as data instances of the feature set 122 that correspond to the features 110 of the industrial facility 100. Given the localized position and the desired position, a travel path can be determined for the industrial vehicle 10. Once the travel path is known, the industrial vehicle 10 can travel along the travel path to navigate the surface 102 of the industrial facility 100. Specifically, the one or more processors 20 can execute machine readable instructions to operate the industrial vehicle 10. For example, the one or more processors 20 can adjust the steering of the wheels 16 and control the throttle to cause the industrial vehicle 10 to navigate the surface 102.

As is noted above, the EBL sensor 30 can be configured to detect features 110 in its environment such as, for example, an industrial facility 100. Depending on the type of sensors that are utilized to form the EBL sensor 30, the features 110 that the EBL sensor 30 can detect from a given position may be limited. For example, some features 110 can only be detected by certain sensor types. Other limiting factors can include field of view 34 of the EBL sensor 30, or occlusions 112 in the environment.

Figure 3:
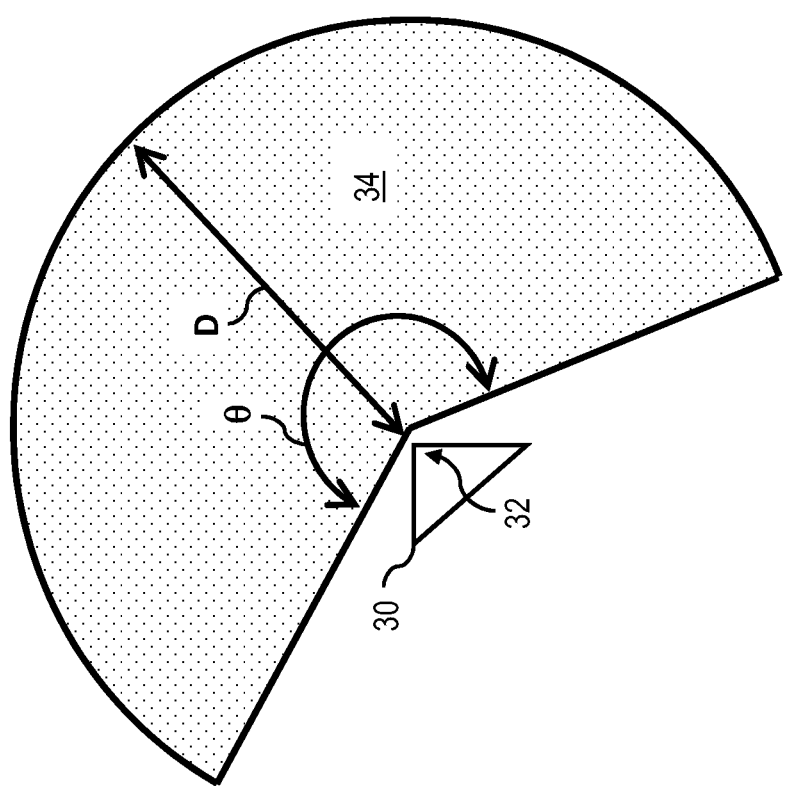
FIG. 3 schematically depicts a sensor according to one or more embodiments shown and described herein.

Referring collectively to FIGS. 2 and 3, the EBL sensor 30 can be configured to detect objects within the field of view 34. The field of view 34 can be represented as a region of space that extends from the sensor origin 32 of the EBL sensor 30, i.e., any location of the EBL sensor that can utilized as a spatial reference point or datum. In some embodiments, the sensor origin 32 of the EBL sensor 30 can be the portion of the EBL sensor 30 that is configured to receive signals sensed from the environment. The extent of the field of view 34 can be further defined by a distance range D of the EBL sensor 30 and an angular range θ of the EBL sensor 30. Specifically, the field of view 34 can be represented as a substantially arch shaped region formed by sweeping the distance range D from the sensor origin 32 of the EBL sensor 30 by the angular range θ. It is noted that, while the field of view 34 is depicted in FIG. 3 as being a substantially arch shaped region for clarity, the field of view 34 can be any shape corresponding to the detection capabilities of the EBL sensor 30. Additionally, it is noted that the EBL sensor 30 can comprise one or more sensors each having a sensor origin 32 and field of view 34. Accordingly, in such embodiments, the EBL sensor 30 can comprise a plurality of sensor origins and corresponding fields of view.

As is noted above, the feature detection capability of the EBL sensor 30 can be limited by occlusions 112 in the industrial facility 100. Occlusions 112 can be objects within the physical environment that can obstruct or prevent the EBL sensor 30 from detecting objects. In the context of the industrial facility 100, the occlusions 112 can be any object that is not transmissive of signals emanating from or directed to the EBL sensor 30, such as, for example, walls, pallets, racks, workers, or the like. Accordingly, as depicted in FIG. 2, the occlusions 112 within the industrial facility 100 can truncate or limit the extent of the field of view 34 (FIG. 3) of the EBL sensor 30 into a truncated field of view 40 (FIG. 2).

Referring again to FIGS. 1 and 2, the map data 120 can comprise a feature set 122 corresponding to the features 110 of the industrial facility 100 and occlusion set 124 corresponding to the occlusions 112 of the industrial facility 100. Generally, the map data 120 can comprise a coordinate system that maps instances of the feature set 122 to the corresponding features 110 in physical space and instances of the occlusion set 124 to the corresponding occlusions 112 in physical space. In some embodiments, the features 110 and occlusions 112 can be represented in the map data 120 as geometric objects such as, for example, volumes, surfaces, edges, curves, points, and other objects suitable for representing physical objects.

Accordingly, the instances of the feature set 122 and the occlusion set 124 of the map data 120 can be implemented using geometries corresponding to a coordinate system (e.g., Cartesian coordinate system) such as, for example, two dimensional point (x, y), three dimensional point (x, y, z), two dimensional line segment defined by two dimensional points (x1, y1) and (x2, y2), three dimensional line segment defined by three dimensional points (x1, y1, z1) and (x2, y2, z2)], or the like. In some embodiments, such as environments having symmetry (e.g., warehouse racking), the industrial facility 100 can be mapped to a two dimensional model. Accordingly, the computational requirements can be reduced by ignoring the z-dimension (height) of features 110 and occlusions 112 of the industrial facility 100 in the map data 120.

The features 110, the occlusions 112 and the EBL sensor 30 can be modeled as being projected onto a plane substantially parallel to the surface 102. For example, each of the features 110 can be implemented geometrically in the map data 120 as a point feature 114, or a line feature 116. Specifically, each of the point features 114 can be defined by a point (x, y) in the feature set 122 in a two dimensional coordinate system. Each of the line features 116 can be defined by a start point (x1, y1) and an end point (x2, y2) in the feature set 122 in a two dimensional coordinate system. Similarly, each occlusion 125 of the occlusion set 124 can be defined by a start point (x1, y1) and an end point (x2, y2) in a two dimensional coordinate system corresponding to one of the occlusions 112. It is noted that, while the embodiments described herein are described with respect to two dimensional mapping for clarity, the examples provided herein can be extended to three dimensions such as, for example, by modeling the z-dimension of features 110 and occlusions 112 of the industrial facility 100 in the map data 120.

Figure 4:
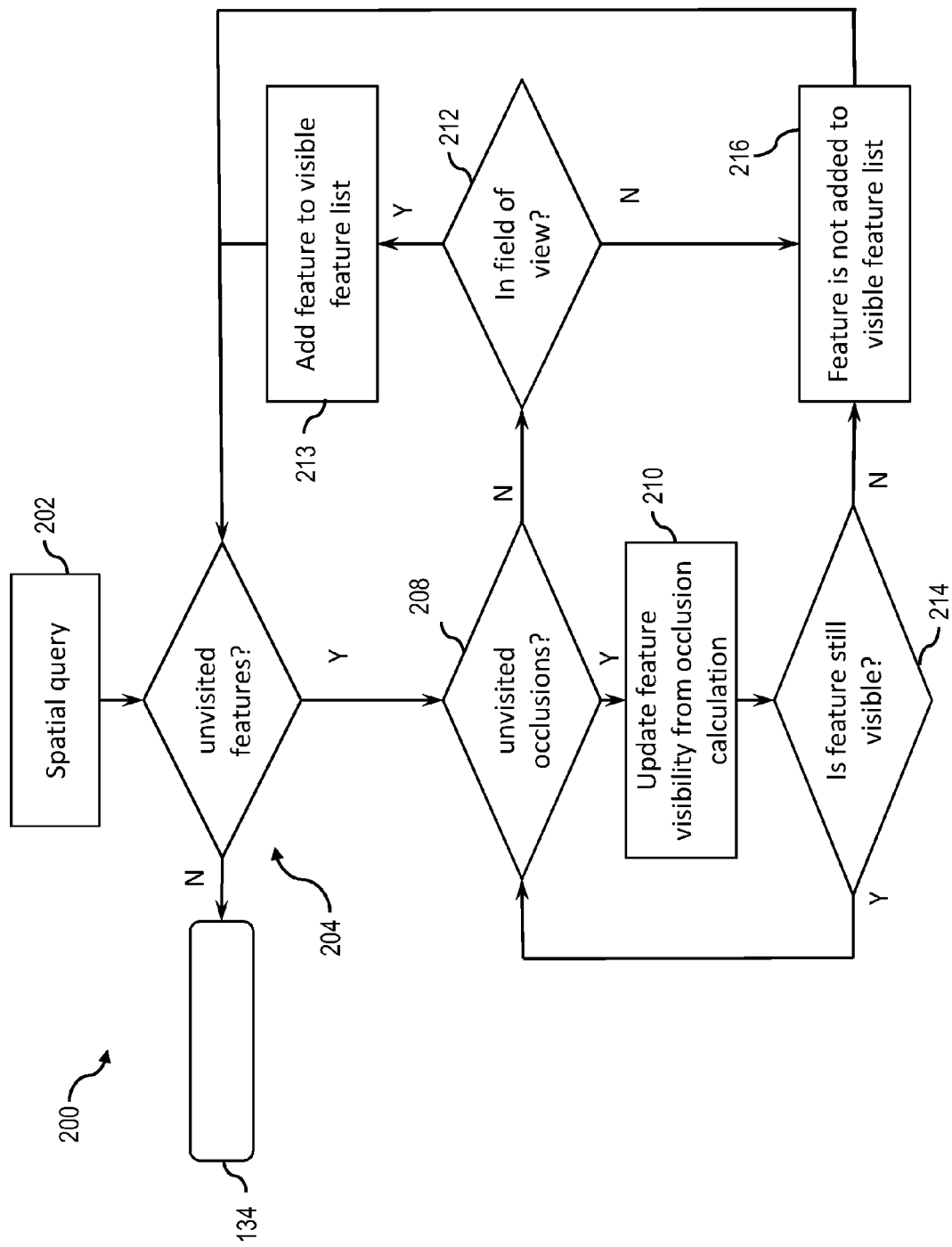
FIG. 4 schematically depicts an exemplary process for determining the visibility of features according to one or more embodiments shown and described herein.

An exemplary method 200 for excluding occluded features from being utilized for performing localization or navigation is schematically depicted in FIG. 4. Referring collectively to FIGS. 1 and 4, the method 200 depicts an iterative approach for searching through unvisited, i.e., unanalyzed, instances of the feature set 122 and comparing the unvisited instances of the feature set 122 to unvisited instances of the occlusion set 124. It is noted that, while the processes of the method 200 are enumerated and depicted as being performed in a particular sequence, the processes can be performed in an alternative order without departing from the scope of the present disclosure. For example, in some embodiments, the order of occlusion calculations can be ordered according to a heuristic of the industrial facility, as is explained in greater detail below. It is furthermore noted that one or more of the processes can be omitted without departing from the scope of the embodiments described herein.

Referring collectively to FIGS. 1 to 4, at process 202, an initial spatial query can be performed using the map data 120 having a feature set 122 associated with the features 110 of the industrial facility 100. The detectable feature set 126 can be selected from the feature set 122. The detectable feature set 126 can correspond to features 110 within a detection range of a location of the EBL sensor 30, which generally corresponds to the field of view 34 that is not truncated (depicted in FIG. 3). In some embodiments, the location of the EBL sensor 30 can be determined with respect to the industrial facility 100, e.g., via localization. The location of the EBL sensor 30 can be utilized to determine the detection range of the EBL sensor 30, as is described hereinabove with respect to the field of view 34. The detection range of the EBL sensor 30 can be compared to the position of each instance of the feature set 122 of the map data 120. The detectable feature set 126 can include a portion of the feature set 122 associated with positions that are within the field of view 34 of the EBL sensor 30. Accordingly, the detectable feature set 126 can be dependent upon the location of the EBL sensor 30. Moreover, the detectable feature set 126 can be updated dynamically as the industrial vehicle 10 is navigated, i.e., moves, throughout the industrial facility 100.

Alternatively or additionally, a detectable occlusion set 128 can be selected from the occlusion set 124 of the map data 120. The field of view 34 of the EBL sensor 30 can be compared to the position of each instance of the occlusion set 124 of the map data 120. The detectable occlusion set 128 can include a portion of the occlusion set 124 associated with positions that are within the field of view 34 of the EBL sensor 30. Accordingly, the detectable occlusion set 128 can be updated dynamically in a manner analogous to the detectable feature set 126.

The map data 120 corresponding to each occlusion 112 within the field of view 34 of the EBL sensor 30 can be compared to the map data 120 corresponding to each feature 110 within the field of view 34 of the EBL sensor 30 to determine which features 110 should be compared to the map data 120 to determine the location of the EBL sensor 30 and/or the industrial vehicle 10. Accordingly, if any of the features 110 corresponding to the detectable feature set 126 are not visible due to the occlusions 112 corresponding to the detectable occlusion set 128, the features 110 that are not visible can be can be determined as occluded 130. During localization, the instances of the detectable feature set 126 corresponding to the features 110 that are determined to be occluded 130 can be omitted. Alternatively or additionally, the features 110 corresponding to instances of the detectable feature set 126 that are not blocked by instances of the detectable occlusion set 128 can be can be determined as visible 132. Accordingly, during localization, the instances of the detectable feature set 126 corresponding to the features 110 that are determined to be visible 132 can be utilized for localization and navigation.

Additionally, in some embodiments, the EBL sensor 30 can comprise one or more sensors each having a sensor origin 32 and field of view 34. Accordingly, the visibility of the features 110 can be dependent upon each of the one or more sensors of the EBL sensor 30. In such embodiments, the comparisons of map data 120 corresponding to occlusions 112 within the field of view 34 of each of the one or more sensors of the EBL sensor 30 and the map data 120 corresponding to each feature 110 within the field of view 34 of each of the one or more sensors of the EBL sensor 30 can be performed. Thus, it is noted that, while the embodiments provided herein may be described with respect to a single sensor origin, the embodiments provided herein can perform occlusion calculations for each sensor of the EBL sensor 30. In some embodiments, if the feature 110 is determined visible 132 by any sensor of the EBL sensor 30, then the feature 110 can be used by EBL for navigation or localization. Alternatively or additionally, if the feature 110 is determined occluded 130 by all of the sensors of the EBL sensor 30, then the feature 110 can be excluded from use by the EBL for navigation or localization.

The method 200 can comprise a calculation management function 204 for ensuring that the detectable feature set 126 is compared to the detectable occlusion set 128 and generating a visible feature list 134. It is noted that the visible feature list 134 can comprise any data management technique suitable for tracking detectable features for use with navigation or localization such as, for example, a list, an array, a property, an attribute, or the like. In some embodiments, the calculation management function 204 can be configured to ensure that each instance of the detectable feature set 126 is compared to each instance of the detectable occlusion set 128. For example, in the embodiment depicted FIG. 4, the calculation management function 204 can iteratively compare each instance of the detectable feature set 126 to each instance of the detectable occlusion set 128 using nested loops. Specifically, the calculation management function 204 can comprise a feature looping process 206 and an occlusion looping process 208 that is nested with respect to the feature looping process 206.

The feature looping process 206 can be configured to iterate through the instances of the detectable feature set 126 to ensure that each instance (i.e., detectable feature) is visited and utilized for comparison with the each instance (i.e., detectable occlusion) of the detectable occlusion set 128. For example, in the embodiment depicted in FIG. 4, the feature looping process 206 can determine if the detectable feature set 126 comprises any instances that have not been evaluated. If all of the instances of the detectable feature set 126 have been evaluated, the method 200 can return the visible feature list 134 to the EBL for use in localization and navigation. If all of the instances of the detectable feature set 126 have not been evaluated, the method 200 can proceed to the occlusion looping process 208 for evaluation of an unvisited instance.

The occlusion looping process 208 can be configured to iterate through the instances of the detectable occlusion set 128 such that each detectable occlusion is compared to each detectable feature of the detectable feature set 126. For example, in the embodiment depicted in FIG. 4, the occlusion looping process 208 can determine if the detectable occlusion set 128 comprises any instances that have not been evaluated. If all of the instances of the detectable feature set 126 have not been evaluated, the method 200 can proceed to the occlusion calculation process 210 to perform occlusion calculations using the unvisited detectable feature and the unvisited occlusion. If all of the instances of the detectable occlusion set 128 have been evaluated, the method 200 can classify the unvisited instance of the detectable feature set 126 as a visited instance and proceed to the field of view verification process 212, which verifies that the portion of the feature 110 classified as visible 132 is coincident with the field of view 34 (FIG. 3).

Referring still to FIGS. 1-4, if the portion of the feature 110 classified as visible 132 is coincident with the field of view 34, the method 200 can proceed to process 213. At process 213, the instance of the detectable feature set 126 corresponding to the feature 110 can be included with the visible feature list 134, and the method 200 can proceed to the calculation management function 204. If the portion of the feature 110 classified as visible 132 is not coincident with the field of view 34, the feature 110 can be considered occluded 130. Accordingly, the method 200 can proceed to process 216. At process 216, the instance of the detectable feature set 126 corresponding to the feature 110 classified as occluded 130 can be excluded from the visible feature list 134, and the method 200 can proceed to the calculation management function 204.

It is noted that, while one particular calculation management function 204 is depicted for "looping" through the detectable feature set 126, alternative methods can be employed, provided that each instance of the detectable feature set 126 is analyzed as described herein. For example, the feature looping process 206 can be nested within the occlusion looping process 208. Alternatively or additionally, the iterative loops can be replaced by parallel processing, i.e., instead of iterative comparisons performed in a sequence, some or all of the comparisons can be performed simultaneously. Specifically, as is noted below, the impact of multiple occlusions upon a single feature can be determined via superposition. Accordingly, such calculations can be performed substantially in parallel, and may be amenable to parallel computing.

Referring collectively to FIGS. 4 and 5, the occlusion calculation process 210 can be configured to compare the unvisited detectable feature and the unvisited occlusion. In some embodiments, the occlusion calculation process 210 can be configured to classify point features 114 as occluded 130 or visible 132. For example, a point feature 114 can be compared to an occlusion 125 utilizing a line segment/line segment intersection test. Specifically, a line segment 136 can be created between the sensor origin 32 of the EBL sensor 30 and the point feature 114 that is associated with the line segment 136, i.e., the line segment 136 can be demarcated by the sensor origin 32 and the point feature 114. In comparisons where the line segment 136 intersects the occlusion 125, the point feature 114 associated with the line segment 136 can be classified as occluded 130. In comparisons where the line segment 136 and the occlusion 125 do not intersect, the point feature 114 associated with the line segment 136 can be classified as visible 132. As is described in greater detail below, when the point feature 114 is classified as occluded 130, the point feature 114 can be omitted from localization and navigation. Alternatively or additionally, when the point feature 114 is classified as visible 132, the point feature 114 can be utilized for localization and navigation.

Referring collectively to FIGS. 4 and 6A-6D, in some embodiments, the occlusion calculation process 210 can be configured to perform occlusion calculations that characterize the relationship between line features 116 and occlusions 125. For example, occlusion path 140, occlusion path 142, or both can be utilized to characterize the line feature 116. Each of occlusion path 140 and occlusion path 142 can extend through the occlusion 125 and the sensor origin 32 of the EBL sensor 30. In some embodiments, the occlusion path 140 can intersect the occlusion 125 at a start point 144 and the occlusion path 142 can intersect the occlusion 125 at an end point 146.

In some embodiments, a first feature intersection 152 can be determined utilizing the occlusion path 140 and a second feature intersection 154. For example, the line feature 116 can be a line segment that is demarcated by a start point 156 and an end point 158. The first feature intersection 152 can be determined for the start point 156 of the line feature 116 and the second feature intersection 154 can be determined for the end point 158 of the line feature 116. Accordingly, the first feature intersection 152 can be associated with the start point 156 of the line feature 116. The second feature intersection 154 can be associated with the end point 158 of the line feature 116. The first feature intersection 152 can be defined by an intersection between the occlusion path 140 and the line feature 116 or a projection 160 of the line feature 116. Similarly, the second feature intersection 154 can be defined by an intersection between the occlusion path 142 and the line feature 116 or the projection 160 of the line feature 116. The projection 160 of the line feature 116 can extend from each of the start point 156 and the end point 158 along the direction of the line feature 116. Thus, in embodiments where the line feature 116 does not directly intersect the occlusion path 140, the occlusion path 142, or both, the projection 160 can be extended to intersect with the occlusion path 140, the occlusion path 142, or both. It is furthermore noted that, while the occlusion path 140 and the occlusion path 142 are depicted as line segments, the occlusion path 140 and the occlusion path 142 can be extended as long as required to establish the first feature intersection 152 and the second feature intersection 154, as described herein. Accordingly, the occlusion path 140 can be aligned along a direction 148 that begins at the sensor origin 32 and is directed towards the first feature intersection 152 of the line feature 116 and the occlusion path 142 can be aligned along a direction 150 that begins at the sensor origin 32 and is directed towards the first feature intersection 152 of the line feature 116.

Figures 6A, 6B:
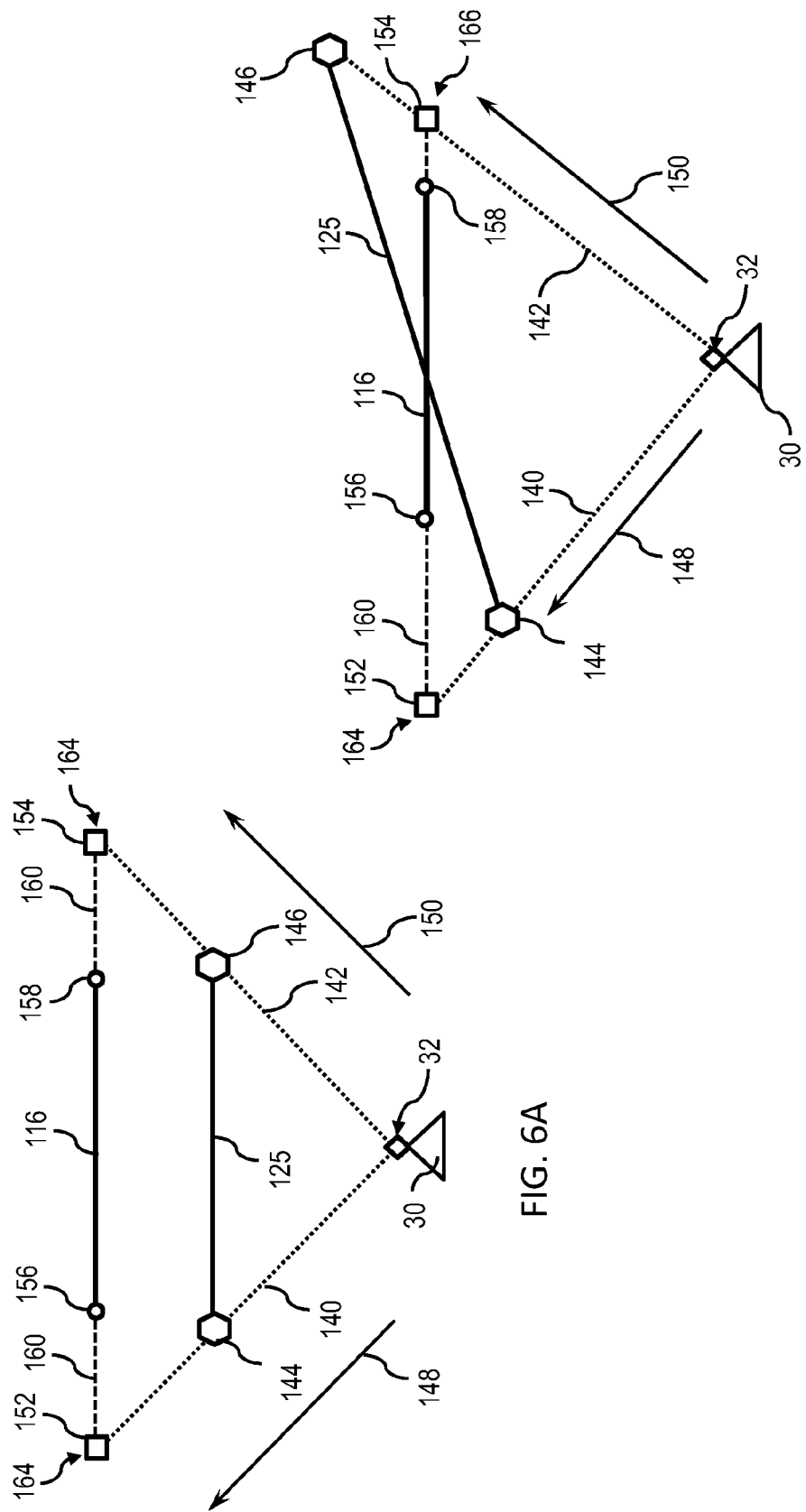
FIGS. 6A-6D schematically depict an exemplary scheme for categorizing feature intersections according to one or more embodiments shown and described herein.
Figure 6D:
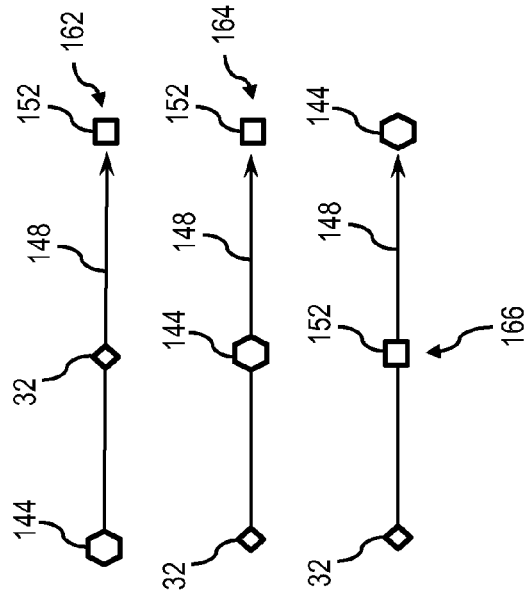
Figure 6C:
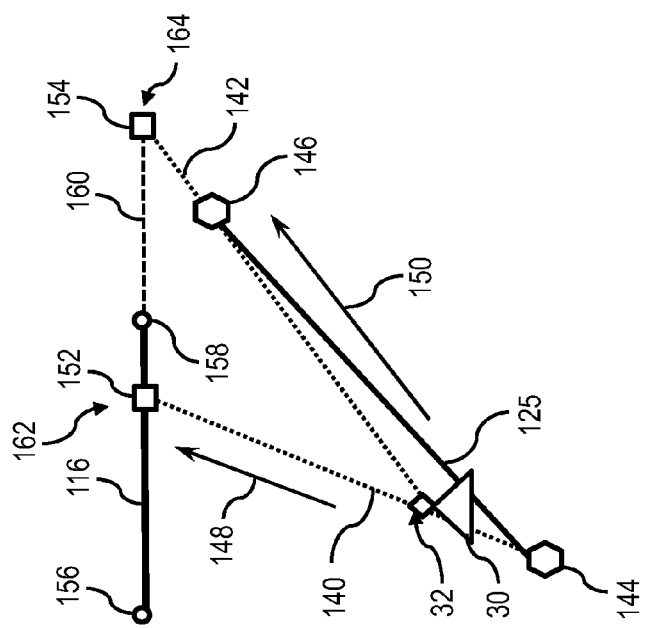

Various arrangements of the line features 116 and the occlusions 125 in the map data 120 can be classified according to the first feature intersection 152 and the second feature intersection 154. Exemplary classification schemes are depicted in FIG. 6D for arrangements of the sensor origin 32, the start point 144 of the occlusion 125, and the first feature intersection 152. Specifically, a classification can be determined based upon an ordering of the sensor origin 32, the start point 144 of the occlusion 125, and the first feature intersection 152 taken along the direction 148. The first feature intersection 152 can be classified as behind 162, when the start point 144 of the occlusion 125 occurs first along the direction 148, i.e., the start point 144 occurs prior to the sensor origin 32 and the first feature intersection 152. The first feature intersection 152 can be classified as between 164, when the start point 144 of the occlusion 125 is in the space separating the sensor origin 32 and the first feature intersection 152. The first feature intersection 152 can be classified as beyond 166, when the start point 144 of the occlusion 125 occurs last along the direction 150, i.e., the start point 144 occurs after to the sensor origin 32 and the first feature intersection 152. As can be seen in FIGS. 6A-6C, the classifications described above with respect to the first feature intersection 152, the sensor origin 32, the start point 144 of the occlusion 125 taken along the direction 148 can be performed in a substantially identical manner for classifications of the second feature intersection 154 making use of the sensor origin 32, the end point 146 of the occlusion 125, and the direction 150.

Various occlusion calculation cases are provided below as non-limiting examples of the embodiments described herein. Each of the cases can be performed in any order without departing from the embodiments described herein. Additionally, any of the cases can be omitted without departing from the scope of the present disclosure. However, it is noted, that applicants have discovered a reduced computational cost, i.e., less computational time with equivalent hardware, can be achieved by determining the visibility of features 110 by performing occlusion calculations of the cases described herein, in sequential order.

Figure 7B:
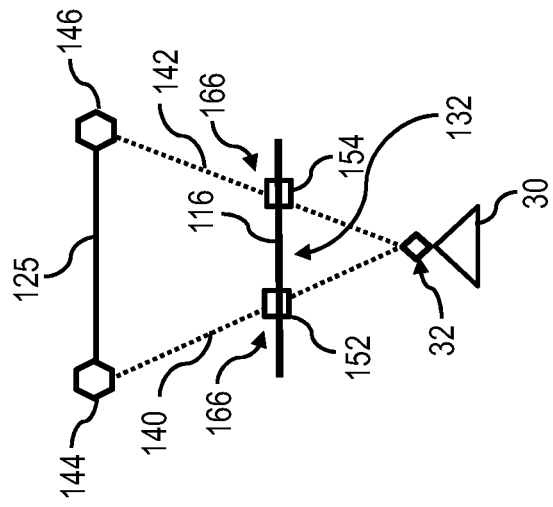
FIGS. 7A-13B schematically depict a method for performing occlusion calculations to classify the visibility of features according to one or more embodiments shown and described herein.
Figure 7A:
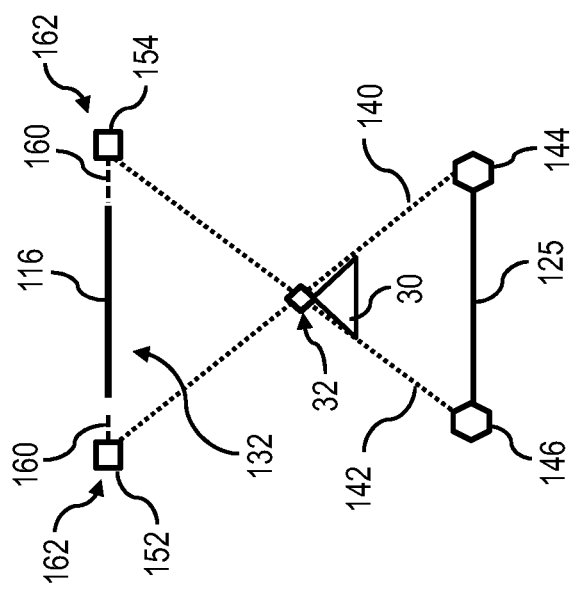

Referring collectively to FIGS. 4 and 7A-7B, a first case, which can be evaluated by the occlusion calculation process 210, is schematically depicted. In the first case, the line feature 116 can be associated with a first feature intersection 152 that has been classified as behind 162 and a second feature intersection 154 that has been classified as behind 162 (FIG. 7A). Alternatively or additionally, the line feature 116 can be associated with a first feature intersection 152 that has been classified as beyond 166 and a second feature intersection 154 that has been classified as beyond 166 (FIG. 7B). In embodiments where the first feature intersection 152 and the second feature intersection 154 is classified as an instance of the first case, the portion of the line feature 116 between the first feature intersection 152 and the second feature intersection 154 can be determined as visible 132. Having reached a final determination with respect to visibility, the method 200 can proceed from the occlusion calculation process 210 to a superposition process 214. Alternatively, should the line feature 116 not match the first case, the occlusion calculation process 210 can proceed to the second case.

Figure 8C:
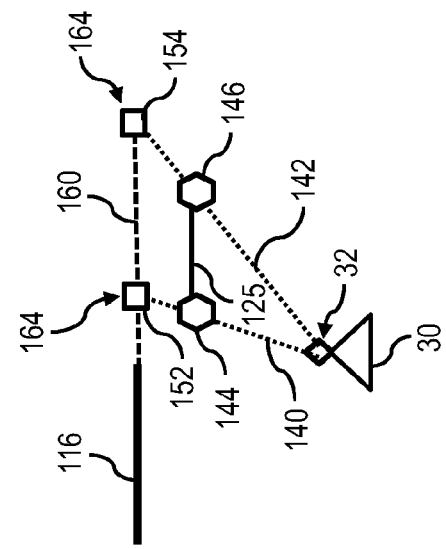
Figure 8A:
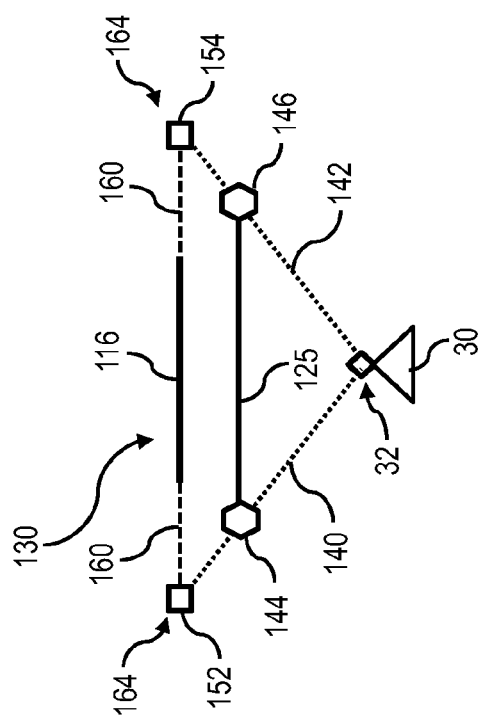
Figure 8B:
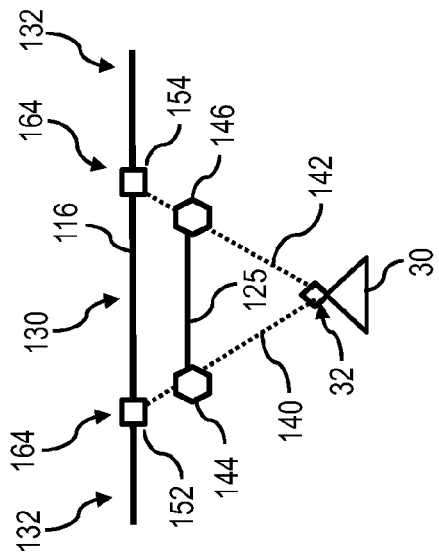

Referring collectively to FIGS. 4 and 8A-8C, a second case, which can be evaluated by the occlusion calculation process 210 subsequent to the first case, is schematically depicted. In the second case, the line feature 116 can be associated with a first feature intersection 152 that has been classified as between 164 and a second feature intersection 154 that has been classified as between 164. In embodiments where the first feature intersection 152 and the second feature intersection 154 is classified as an instance of the second case, the portion of the line feature 116 between the first feature intersection 152 and the second feature intersection 154 can be determined as occluded 130 (FIGS. 8A and 8B). The portion of the line feature 116 that is not between the first feature intersection 152 and the second feature intersection 154 can be determined as visible 132, which can include some (FIG. 8B) or all (FIG. 8C) of the line feature 116. Having reached a final determination with respect to visibility of the line feature 116 with respect to the occlusion 125, the method 200 can proceed from the occlusion calculation process 210 to the superposition process 214. Alternatively, should the line feature 116 not match the second case, the occlusion calculation process 210 can proceed to the third case.

Referring now to FIGS. 4 and 9A-9C, in some embodiments, the occlusion calculation process 210 can be configured to characterize the relationship between line features 116 and occlusions 125. For example, a feature path 170, a feature path 172, or both can be utilized to characterize the line feature 116. Each of the feature path 170 and the feature path 172 can extend through the line feature 116 and the sensor origin 32 of the EBL sensor 30. In some embodiments, the feature path 170 can intersect the line feature 116 at the start point 156 and the feature path 172 can intersect the line feature 116 at the end point 158.

A third case can be evaluated by the occlusion calculation process 210 subsequent to the second case via the feature path 170 and the feature path 172. Specifically, the line feature 116 can be determined as occluded 130, when the occlusion 125 intersects both the feature path 170 and the feature path 172. For line features 116 that match the third case and are determined as occluded 130, the method 200 can proceed from the occlusion calculation process 210 to the superposition process 214. Alternatively, should the line feature 116 not match the third case, the occlusion calculation process 210 can proceed to the fourth case. It is noted that, for cases subsequent to the third case, the occlusion 125 can be assumed to intersect with the line feature 116 or the projection 160 from the line feature 116.

Referring collectively to FIGS. 4 and 10A-10C, a fourth case, which can be evaluated by the occlusion calculation process 210 subsequent to the third, is schematically depicted. In the fourth case, a feature-occlusion intersection 174 can be formed by the projection 160 of the line feature 116 and the occlusion 125 (FIGS. 10A and 10B) or a projection 176 (FIG. 10C) of the occlusion 125. Accordingly, the feature-occlusion intersection 174 can fail to directly intersect the line feature 116, i.e., the feature-occlusion intersection 174 does not fall within the feature path 170 and the feature path 172. Additionally, in the fourth case, the occlusion 125 can fail to intersect both the feature path 170 and the feature path 172. For line features 116 that match the fourth case, the line feature 116 can be classified as visible 132, and the method 200 can proceed from the occlusion calculation process 210 to the superposition process 214. Alternatively, should the line feature 116 not match the fourth case, the occlusion calculation process 210 can proceed to the fifth case.

Figure 11B:
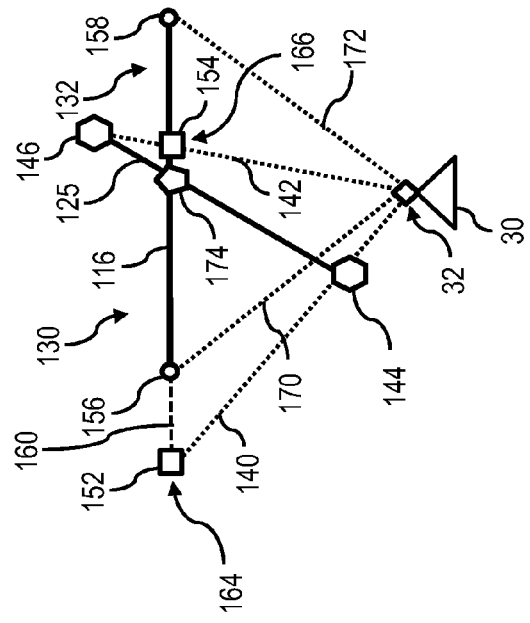
Figure 11A:
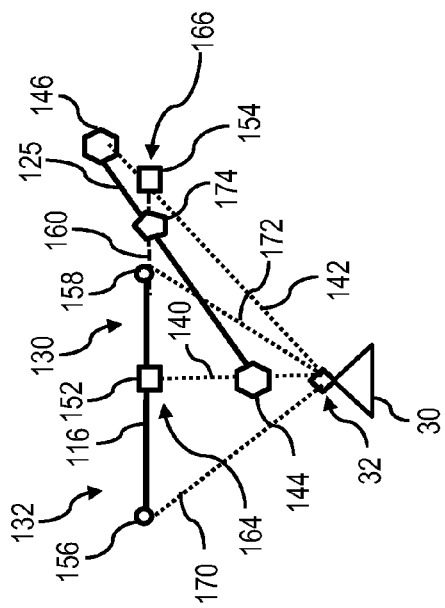
Figures 11C, 11D:
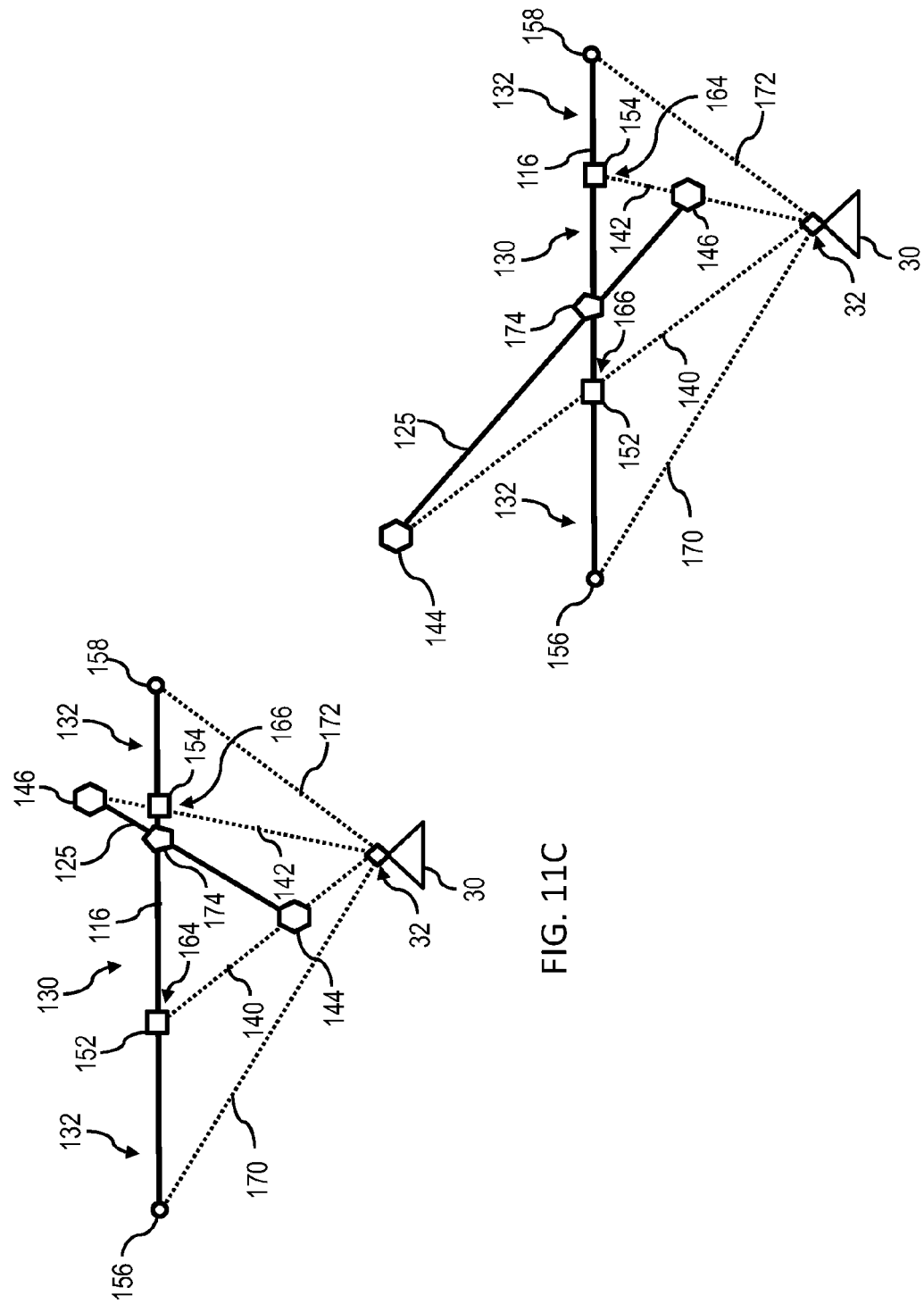

Referring collectively to FIGS. 4 and 11A-11D, a fifth case, which can be evaluated by the occlusion calculation process 210 subsequent to the fourth case, is schematically depicted. In the fifth case, the feature-occlusion intersection 174 can be formed, the first feature intersection 152 can be classified as between 162, and the second feature intersection 154 can be classified as beyond 166 (FIGS. 11A-11C). Accordingly, the portion of the line feature 116 between the first feature intersection 152 and the feature-occlusion intersection 174 can be classified as occluded 130. The remaining portion of the line feature 116 can be classified as visible 132. Alternatively or additionally, the fifth case can include arrangements where the feature-occlusion intersection 174 can be formed, the first feature intersection 152 can be classified as beyond 166, and the second feature intersection 154 can be classified as between 164 (FIG. 11D). Thus, the portion of the line feature 116 between the feature-occlusion intersection 174 and the second feature intersection 154 can be classified as occluded 130. The remaining portion of the line feature 116 can be classified as visible 132. Upon classifying the line feature 116 as occluded 130 and visible 132, the method 200 can proceed from the occlusion calculation process 210 to the superposition process 214. Alternatively, should the line feature 116 not match the fifth case, the occlusion calculation process 210 can proceed to the sixth case.

Figure 12A:
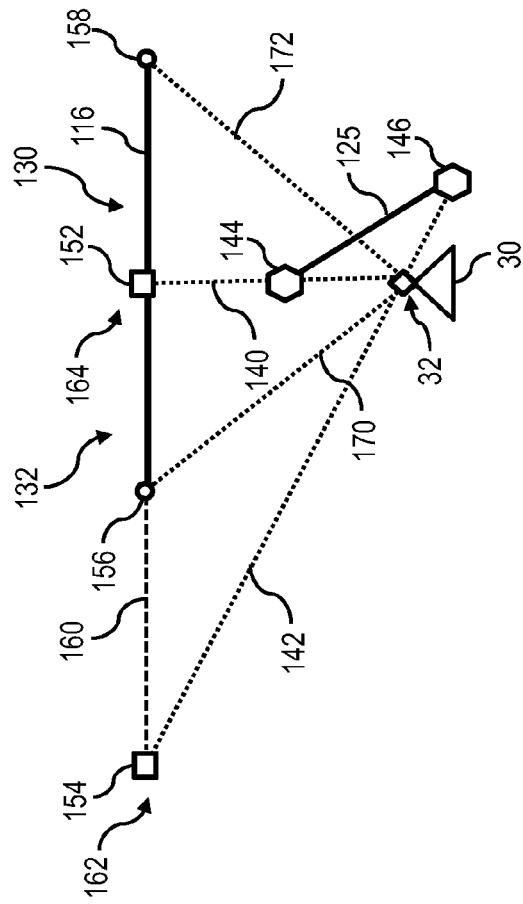
Figure 12B:
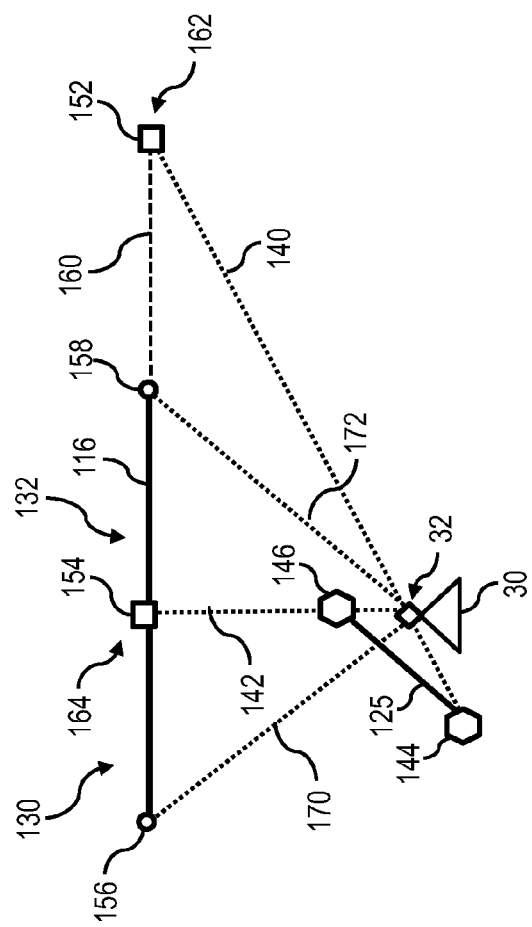

Referring collectively to FIGS. 4 and 12A-12B, a sixth case, which can be evaluated by the occlusion calculation process 210 subsequent to the fifth case, is schematically depicted. In the sixth case, the first feature intersection 152 can be classified as between 164 and the second feature intersection 154 can be classified as behind 162 (FIG. 12A), or the first feature intersection 152 can be classified as behind 162 and the second feature intersection 154 can be classified as between 164 (FIG. 12B). For line features 116 that match the sixth case, the portion of the line feature 116 starting at the feature intersection classified as between 164 to the side of the occlusion 125 can be classified as occluded 130. The remaining portion of the line feature 116 can be classified as visible 132. Specifically, as depicted in FIG. 12A, the portion of the line feature 116 from the start point 156 to the first feature intersection 152 can be classified as visible 132 and the portion of the line feature 116 from the first feature intersection 152 to the end point 158 can be classified as occluded 130. Similarly, as depicted in FIG. 12B, the portion of the line feature 116 from the start point 156 to the second feature intersection 154 can be classified as occluded 130 and the portion of the line feature 116 from the second feature intersection 154 to the end point 158 can be classified as visible 132. Upon classifying the line feature 116 as occluded 130 and visible 132, the method 200 can proceed from the occlusion calculation process 210 to the superposition process 214. Alternatively, should the line feature 116 not match the sixth case, the occlusion calculation process 210 can proceed to the seventh case.

Figure 13B:
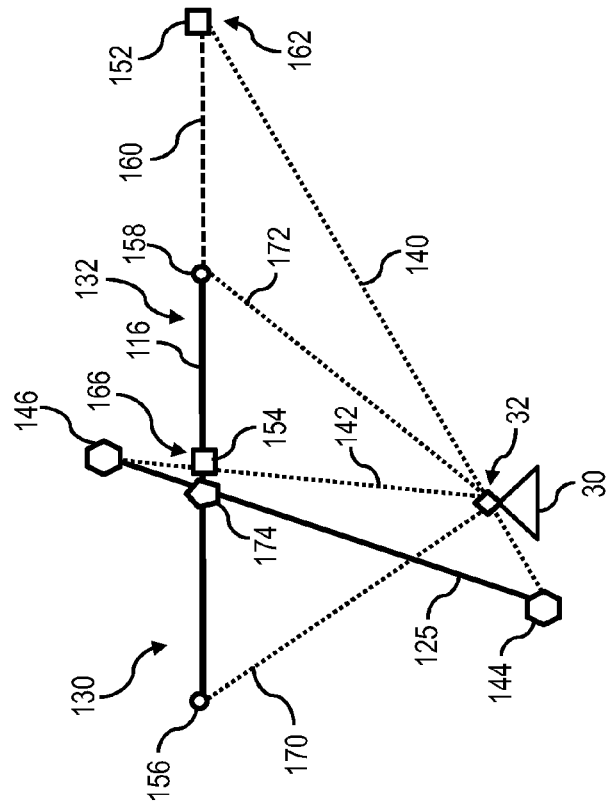
Figure 13A:
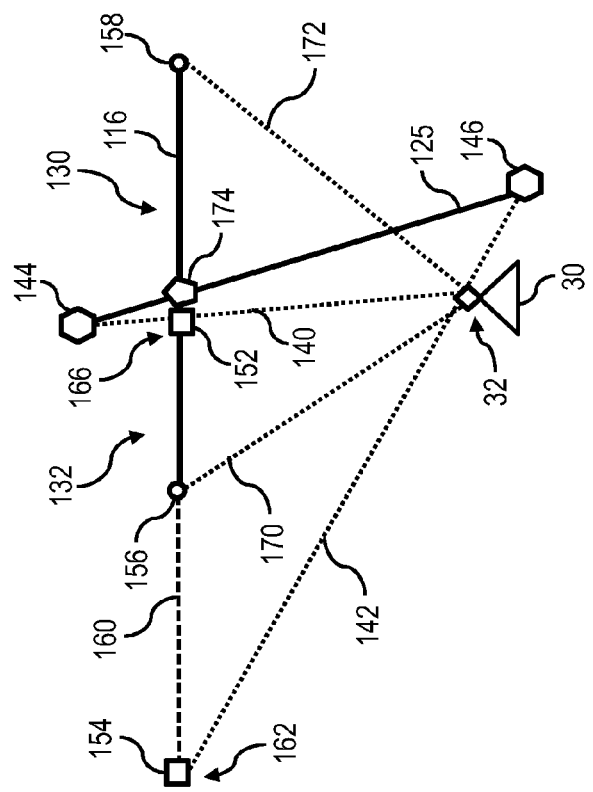

Referring collectively to FIGS. 4 and 13A-13B, a seventh case, which can be evaluated by the occlusion calculation process 210 subsequent to the sixth case, is schematically depicted. In the seventh case, the feature-occlusion intersection 174 can be formed, the first feature intersection 152 can be classified as beyond 166, and the second feature intersection 154 can be classified as behind 162. Alternatively or additionally, in the seventh case, the feature-occlusion intersection 174 can be formed, the first feature intersection 152 can be classified as behind 162, and the second feature intersection 154 can be classified as beyond 166. For line features 116 that match the seventh case, the portion of the line feature 116 between the feature-occlusion intersection 174 and the feature intersection classified as behind 162 can be classified as visible 132. The remaining portion of the line feature 116, which can be defined as the region from the feature-occlusion intersection 174 to the side of the occlusion 125 can be classified as occluded 130. Specifically, as depicted in FIG. 13A, the portion of the line feature 116 from the start point 156 to the feature-occlusion intersection 174 can be classified as visible 132 and the portion of the line feature 116 from the feature-occlusion intersection 174 to the end point 158 can be classified as occluded 130. Similarly, as depicted in FIG. 13B, the portion of the line feature 116 from the start point 156 to the feature-occlusion intersection 174 can be classified as occluded 130 and the portion of the line feature 116 from the feature-occlusion intersection 174 to the end point 158 can be classified as visible 132. Upon performing occlusion calculations corresponding to the seventh case, the method 200 can proceed to the superposition process 214.

Referring collectively to FIGS. 1, 2 and 4, the method can comprise the superposition process 214, which can be configured to iterate through the occlusions 125 associated with the detectable occlusion set 128 to determine a cumulative impact upon visibility. Specifically, the superposition process 214 can determine whether the feature 110 associated with the detectable feature set 126 has been determined visible 132 or occluded 130. If the feature 110 is determined as not visible, i.e., occluded 130, the method 200 can proceed to process 216, which operates to exclude the feature 110 that is occluded 130 from use in localization. For example, the instance of the feature 110 that is occluded 130 can be removed or omitted from the visible feature list 134. If any portion of the feature 110 is determined as visible 132, i.e., the feature 110 is at least partially visible, the method 200 can proceed to occlusion looping process 208 to consider any unvisited instances of the detectable occlusion set 128. Accordingly, the method 200 can consider the impact of multiple occlusions 112 upon the visibility of features 110.

Referring collectively to FIGS. 1 and 14A-14C, the impact of multiple occlusions 112 can be determined via superposition. In some embodiments, the occlusions 112 can correspond to a first occlusion 50 and a second occlusion 52 in the map data 120, and the features 110 can correspond to a first line feature 54 and a second line feature 56 in the map data 120. The visibility of each of the first line feature 54 and the second line feature 56 can depend upon a combined effect of the first occlusion 50 and the second occlusion 52. Specifically, each of the first line feature 54 and the second line feature 56 may be at least partially visible when considering the first occlusion 50 and the second occlusion 52 alone, but may be completely occluded when considering the first occlusion 50 and the second occlusion 52 in combination. Visible regions of the features 110 can be tracked for each occlusion 112 and merged to determine the combined effect of all of the occlusions 112.

Figure 14A:
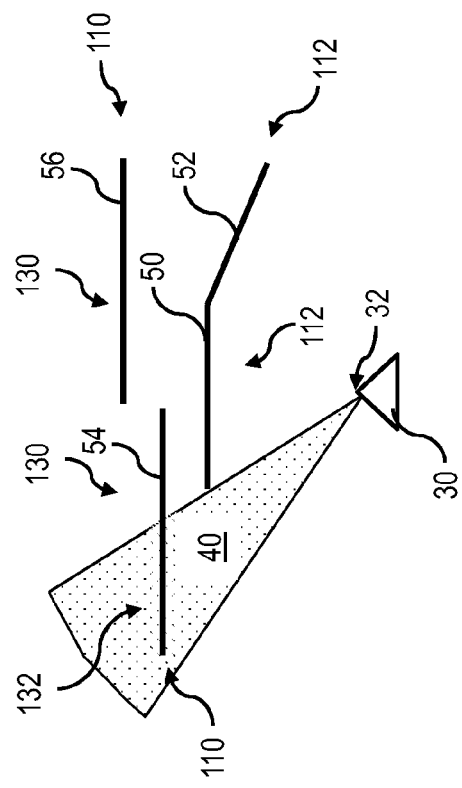
FIGS. 14A-14C schematically depict an exemplary process for determining the visibility of features with respect to multiple occlusions according to one or more embodiments shown and described herein.
Figure 14B:
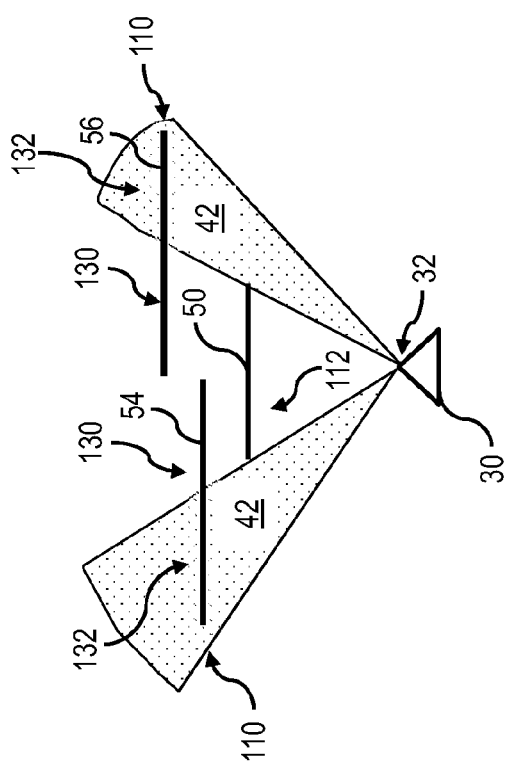
Figure 14C:
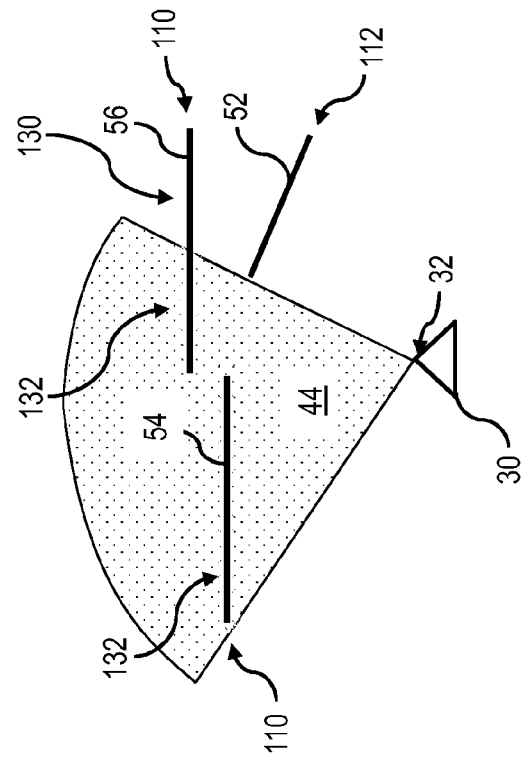

The combined effect of the occlusions 112 can be understood by comparing the truncated field of view 40 (FIG. 14A) and the first truncated field of view 42 (FIG. 14B) and the second truncated field of view 44 (FIG. 14C). The truncated field of view 40 depicts the impact of the first occlusion 50 and the second occlusion 52 upon the visibility of the first line feature 54 and the second line feature 56. Specifically, the first line feature 54 is partially visible, i.e., a portion of the first line feature 54 is visible 132 and a portion of the first line feature 54 is occluded 130, and the second line feature 56 is occluded 130. The overlap between the truncated field of view 40 and the first line feature 54 can define the portion of the first line feature 54 classified as visible 132.

The portion of the first line feature 54 classified as visible 132 considering the combined impact of the first occlusion 50 and the second occlusion 52, is classified as visible 132 when considering in each of the first occlusion 50 and the second occlusion 52 individually. As can be seen in the embodiment depicted in FIGS. 14A-14C, the combined impact of the occlusions 112 upon visibility can be analogous to a logical "AND" operation, i.e., a portion of a feature 110 can be classified as visible 132, if the portion is classified as visible 132 in the first truncated field of view 42 (FIG. 14B) and the second truncated field of view 44 (FIG. 14C). Similarly, the combined impact of the occlusions 112 can be analogous to a logical "OR" operation, i.e., a portion of a feature 110 can be classified as occluded 130, if the portion is classified as occluded 130 in the first truncated field of view 42 (FIG. 14B) or the second truncated field of view 44 (FIG. 14C). Accordingly, the occlusions 112 can be considered individually, and the combined impact of all of the occlusions 112 can be combined using logical operations for superposition. As is explained hereinabove, if there are no visible regions of a feature 110 remaining after multiple occlusions 112 are considered, then instances of the feature set 122 corresponding to the feature 110 can be determined as occluded 130 and can be omitted from localization and navigation.

Referring collectively to FIGS. 2, 4, 12A, and 15, the occlusion calculation process 210 can perform occlusion calculations in order to characterize the relationship between features 110 and occlusions 112. In some embodiments, the occlusion calculation process 210 can classify features 110 according to a calculation method 220. The calculation method 220 can be initiated with process 222, which can perform an occlusion calculation to characterize the start point 144 and the occlusion path 140. Specifically, the process 222 can determine whether the start point 144 associated with the occlusion path 140 is inside the feature path 170 and the feature path 172, i.e., bounded by the substantially triangular area demarcated by the line feature 116, the feature path 170 and the feature path 172. If the start point 144 is inside the feature path 170 and the feature path 172 (e.g., FIG. 12A), the calculation method 220 can proceed to process 224. If the start point 144 is not inside the feature path 170 and the feature path 172 (e.g., FIG. 12B), the calculation method 220 can proceed to process 226. It is noted that in FIG. 15, an affirmative condition is generally indicated by a "Y" and a negative condition is generally indicated by an "N."

Figure 15:
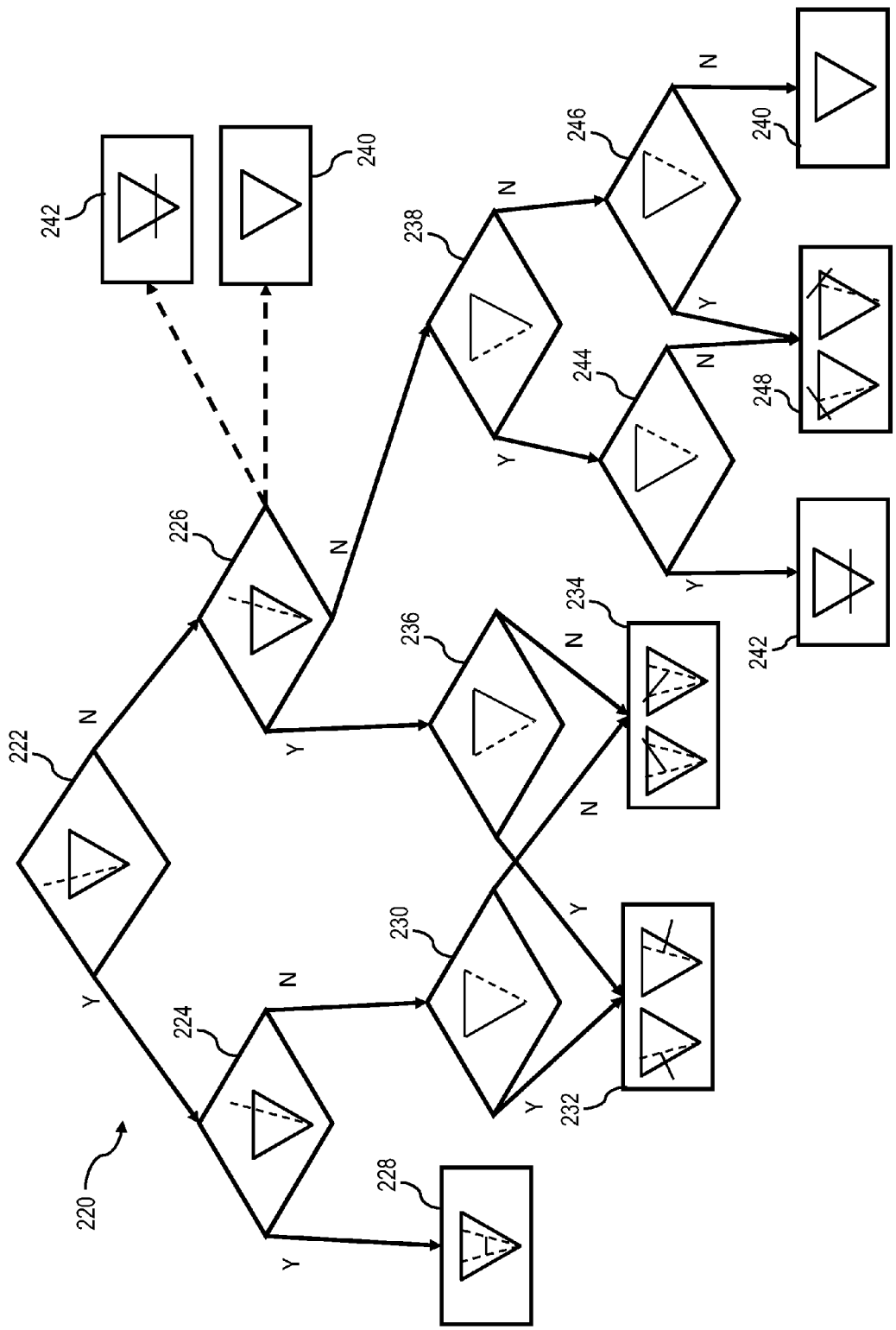
FIG. 15 schematically depicts a method for performing occlusion calculations to classify the visibility of features according to one or more embodiments shown and described herein.

Referring collectively to FIGS. 8B, 12B, and 15, process 224 can perform an occlusion calculation to characterize the end point 146 and the occlusion path 142. Specifically, the process 224 can determine whether the end point 146 associated with the occlusion path 142 is inside the feature path 170 and the feature path 172. If the end point 146 is inside the feature path 170 and the feature path 172 (e.g., FIG. 12B), the calculation method 220 can classify the line feature 116 as having a split occlusion 228. Accordingly, the portion of the line feature 116 between the first feature intersection 152 and the second feature intersection 154 can be determined as occluded 130 (FIG. 8B). If the end point 146 is not inside the feature path 170 and the feature path 172 (e.g., FIG. 12A), the calculation method 220 can proceed to process 230.

Referring collectively to FIGS. 11C, 12A, and 15, process 230 can perform an occlusion calculation to characterize the occlusion 125 and the feature path 172. Specifically, the process 230 can determine whether the occlusion 125 intersects the feature path 172, which is depicted in FIGS. 11C and 12A as being on the right side. If the occlusion 125 intersects the feature path 172, the calculation method 220 can classify the line feature 116 as having a partial occlusion 232 (FIG. 12A). Accordingly, the portion of the line feature 116 from the start point 156 to the first feature intersection 152 can be classified as visible 132 and the portion of the line feature 116 from the first feature intersection 152 to the end point 158 can be classified as occluded 130. If the occlusion 125 does not intersect the feature path 172, the calculation method 220 can classify the line feature 116 as having an intersecting split occlusion 234 (FIG. 11C). Accordingly, the portion of the line feature 116 between the feature-occlusion intersection 174 and the feature intersection classified as between 164 can be classified as occluded 130. The remaining portion of the line feature 116 can be classified as visible 132.

Referring collectively to FIGS. 12B, 13A and 15, the calculation method 220 can comprise a process 226 that can be executed after the process 222 such as, for example, when the condition of process 222 is not met. Process 226 can perform an occlusion calculation to determine whether the end point 146 associated with the occlusion path 142 is inside the feature path 170 and the feature path 172. If the end point 146 is inside the feature path 170 and the feature path 172 (e.g., FIG. 12B), the calculation method 220 can proceed to process 236. If the end point 146 is not inside the feature path 170 and the feature path 172 (e.g., FIG. 13A), the calculation method 220 can proceed to process 238.

Referring collectively to FIGS. 7A, 7B, 8A, and 15, the process 226 can, alternatively or additionally, perform occlusion calculations to review the classification of the first feature intersection 152 and the second feature intersection 154. Specifically, if the first feature intersection 152 and the second feature intersection 154 are both classified as behind 162 (FIG. 7A), the calculation method 220 can classify the line feature 116 as having no occlusion 240. If the first feature intersection 152 and the second feature intersection 154 are both classified as beyond 166 (FIG. 7B), the calculation method 220 can classify the line feature 116 as having no occlusion 240. If the first feature intersection 152 and the second feature intersection 154 are both classified as between 164 and inside (FIG. 8A), the calculation method 220 can classify the line feature 116 as having a full occlusion 242.

Referring collectively to FIGS. 11D, 12B, and 15, process 236, which can follow process 226, can perform an occlusion calculation to characterize the occlusion 125 and the feature path 170. Specifically, the process 236 can determine whether the occlusion 125 intersects the feature path 170, which is depicted in FIGS. 11D and 12B as being on the left side. If the occlusion 125 intersects the feature path 170, the calculation method 220 can classify the line feature 116 as having the partial occlusion 232 (FIG. 12B) and the visibility of the line feature 116 can be determined as noted above. If the occlusion 125 does not intersect the feature path 170, the calculation method 220 can classify the line feature 116 as having the intersecting split occlusion 234 (FIG. 11D) and the visibility of the line feature 116 can be determined as noted above.

Referring collectively to FIGS. 13A, 13B and 15, the calculation method 220 can comprise a process 238 that can be executed after the process 226 such as, for example, when the condition of process 226 is negative. Process 238 can determine whether the occlusion 125 intersects the feature path 170, which is depicted in FIG. 13A as being on the left side. If the occlusion 125 intersects the feature path 170 (e.g., FIG. 13A), the calculation method 220 can proceed to process 244. If the occlusion 125 does not intersect the feature path 170 (e.g., FIG. 13B), the calculation method 220 can proceed to process 246.

Figure 9A:
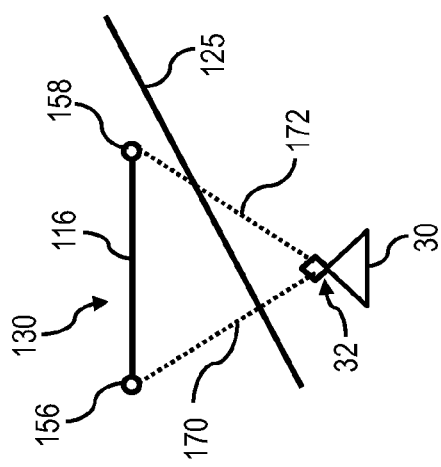
Figure 9C:
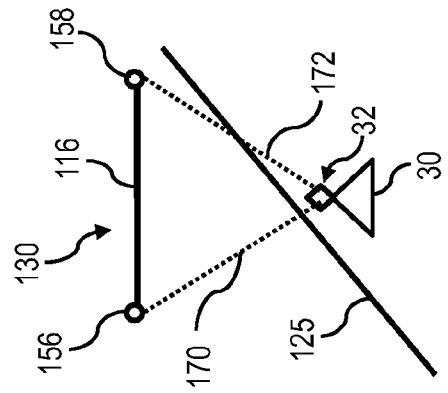
Figure 9B:
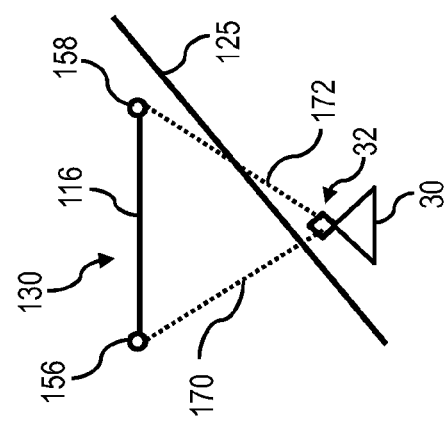

Referring collectively to FIGS. 9A, 13B, and 15, process 244 can perform an occlusion calculation to determine whether the occlusion 125 intersects the feature path 172, which is depicted in FIGS. 9A and 14B as being on the right side. If the occlusion 125 intersects the feature path 172, the calculation method 220 can classify the line feature 116 as having the full occlusion 242 (FIG. 9A). If the occlusion 125 does not intersect the feature path 172, the calculation method 220 can classify the line feature 116 as having an intersecting partial occlusion 248 (FIG. 13B). Accordingly, the portion of the line feature 116 from the start point 156 to the feature-occlusion intersection 174 can be classified as occluded 130 and the portion of the line feature 116 from the feature-occlusion intersection 174 to the end point 158 can be classified as visible 132.

Referring collectively to FIGS. 13A and 15, process 246 can perform an occlusion calculation to determine whether the occlusion 125 intersects the feature path 172, which is depicted in FIG. 13A as being on the right side. If the occlusion 125 intersects the feature path 172, the calculation method 220 can classify the line feature 116 as having the intersecting partial occlusion 248 (FIG. 13A). Accordingly, the portion of the line feature 116 from the start point 156 to the feature-occlusion intersection 174 can be classified as visible 132 and the portion of the line feature 116 from the feature-occlusion intersection 174 to the end point 158 can be classified as occluded 130. If the occlusion 125 does not intersect the feature path 170, the calculation method 220 can classify the line feature 116 as having no occlusion 240.

Figure 16:
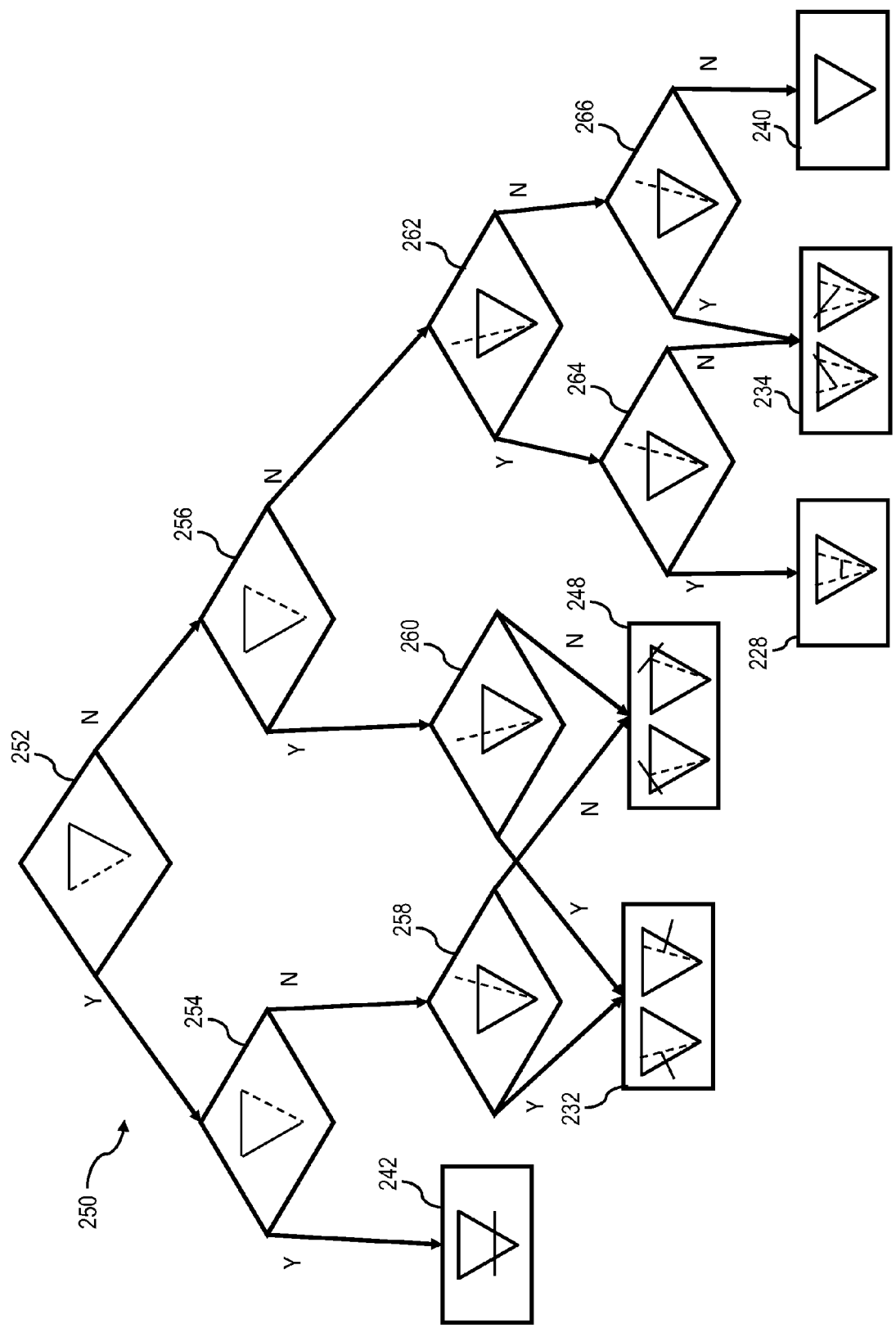
FIG. 16 schematically depicts a method for performing occlusion calculations to classify the visibility of features according to one or more embodiments shown and described herein.

Referring collectively to FIGS. 2, 4, and 16, the occlusion calculation process 210 can perform occlusion calculations in order to characterize the relationship between features 110 and occlusions 125. The occlusion calculation process 210 can classify the visibility of features 110 using a variety of classification schemes including, but not limited to, calculation method 250. It is noted that in FIG. 16, an affirmative condition is generally indicated by a "Y" and a negative condition is generally indicated by an "N."

Figure 10C:
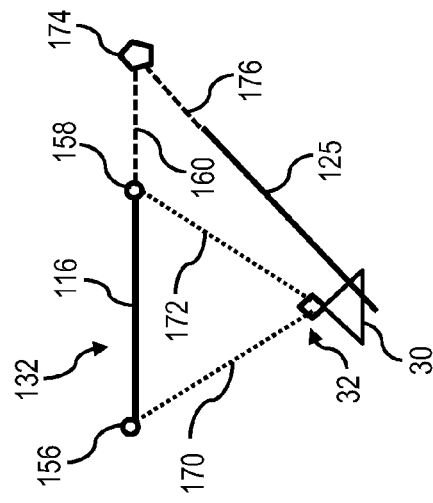
Figure 10A:
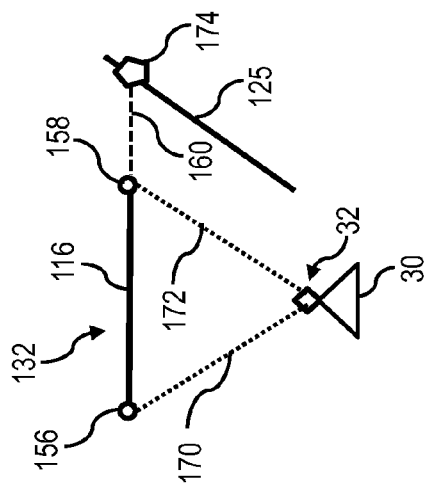
Figure 10B:
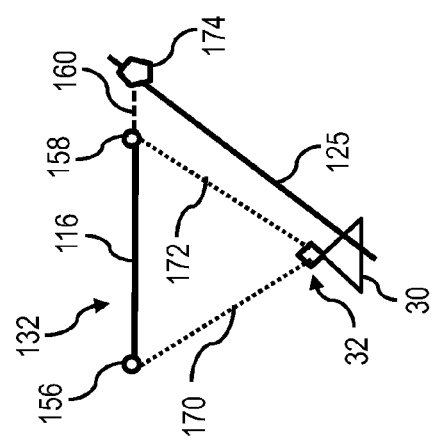

Referring collectively to FIGS. 9A, 10A, and 16, the calculation method 250 can be initiated with process 252, which can perform an occlusion calculation to characterize the occlusion 125 and the feature path 170. Specifically, the process 252 can determine whether the occlusion 125 intersects the feature path 170, which is depicted in FIGS. 9A and 10A as being on the left side. If the occlusion 125 intersects the feature path 172 (e.g., FIG. 9A), the calculation method 250 can proceed to process 254. If the occlusion 125 does not intersect the feature path 172 (e.g., FIG. 10A), the calculation method 250 can proceed to process 256.

Referring collectively to FIGS. 9A, 12B, and 16, process 254 can perform an occlusion calculation to determine whether the occlusion 125 intersects the feature path 172, which is depicted in FIGS. 9A and 12B as being on the right side. If the occlusion 125 intersects the feature path 172 (e.g., FIG. 9A), the line feature 116 can be classified as the full occlusion 242. If the occlusion 125 does not intersect the feature path 172 (e.g., FIG. 12B), the calculation method 250 can proceed to process 258.

Referring collectively to FIGS. 12B, 13B, and 16, process 258 can perform an occlusion calculation to determine whether the end point 146 associated with the occlusion path 142 is inside the feature path 170 and the feature path 172. If the end point 146 is inside the feature path 170 and the feature path 172 (e.g., FIG. 12B), the calculation method 220 can classify the line feature 116 as having the partial occlusion 232. Accordingly, the portion of the line feature 116 between the start point 156 and the first feature intersection 152 can be determined as occluded 130, and the remainder of the line feature can be classified as visible 132. If the end point 146 is not inside the feature path 170 and the feature path 172 (e.g., FIG. 13B), the line feature 116 can be classified as the intersecting partial occlusion 248. The visibility of the line feature 116 can be classified as described herein above with respect to FIG. 13B.

Referring collectively to FIGS. 11D, 13A, and 16, process 256 can be executed following a negative condition of process 252. Process 256 can perform an occlusion calculation to determine whether the occlusion 125 intersects the feature path 172, which is depicted in FIGS. 11D and 13A as being on the right side. If the occlusion 125 intersects the feature path 172 (e.g., FIG. 13A), the calculation method 250 can proceed to process 260. If the occlusion 125 does not intersect the feature path 172 (e.g., FIG. 11D), the calculation method 250 can proceed to process 258.

Referring collectively to FIGS. 12A, 13A, and 16, process 260 can perform occlusion calculations to determine whether the start point 144 associated with the occlusion path 140 is inside the feature path 170 and the feature path 172. If the start point 144 is inside the feature path 170 and the feature path 172 (e.g., FIG. 12A), the line feature 116 can be classified as the partial occlusion 232. Accordingly, the visibility of the line feature 116 can be classified as described above with respect to FIG. 12A. If the start point 144 is not inside the feature path 170 and the feature path 172 (e.g., FIG. 13A), the line feature 116 can be classified as the intersecting partial occlusion 248. Accordingly, the visibility of the line feature 116 can be classified as described above with respect to FIG. 13A.

Referring collectively to FIGS. 11C, 11D, and 16, process 262 can be executed following a negative condition of process 256. Process 262 can perform an occlusion calculation to determine whether the start point 144 associated with the occlusion path 140 is inside the feature path 170 and the feature path 172. If the start point 144 is inside the feature path 170 and the feature path 172 (e.g., FIG. 11C), the calculation method 250 can proceed to process 264. If the start point 144 is not inside the feature path 170 and the feature path 172 (e.g., FIG. 11D), the calculation method 250 can proceed to process 266.

Referring collectively to FIGS. 8B, 11C, and 16, process 264 can perform an occlusion calculation to determine whether the end point 146 associated with the occlusion path 142 is inside the feature path 170 and the feature path 172. If the end point 146 is inside the feature path 170 and the feature path 172 (e.g., FIG. 8B), the calculation method 220 can classify the line feature 116 as having the split occlusion 228. Accordingly, the visibility of the line feature 116 can be classified as described above with respect to FIG. 8B. If the end point 146 is not inside the feature path 170 and the feature path 172 (e.g., FIG. 11C), the line feature 116 can be classified as the intersecting split occlusion 234. The visibility of the line feature 116 can be classified as described herein above with respect to FIG. 11C.

Referring collectively to FIGS. 7A, 11D, and 16, process 266 can be executed following a negative condition of process 262. Process 266 can perform an occlusion calculation to determine whether the end point 146 associated with the occlusion path 142 is inside the feature path 170 and the feature path 172. If the end point 146 is inside the feature path 170 and the feature path 172 (e.g., FIG. 11D), the calculation method 220 can classify the line feature 116 as having the intersecting split occlusion 234. Accordingly, the visibility of the line feature 116 can be classified as described above with respect to FIG. 11D. If the end point 146 is not inside the feature path 170 and the feature path 172 (e.g., FIG. 7A), the line feature 116 can be classified as the no occlusion 240.

Referring again to FIG. 4, the embodiments described herein relate to a plurality of methods for performing the occlusion calculation process 210. As is noted above, the order and types of occlusion calculations can be varied without departing from the scope of the present disclosure. Indeed, applicants have discovered that the embodiments described herein can be performed with a reduced computational cost, when the occlusion calculation process 210 is organized using a cost heuristic based upon the number of occlusion calculations.

Referring collectively to FIGS. 2, 15 and 16, the calculation method 220 and the calculation method 250 were evaluated using a cost heuristic. Specifically, each occlusion type was assigned a cost heuristic based upon the number of occlusion calculations needed to classify a feature 110 as having a specific occlusion type. The industrial facility 100 was evaluated over a utilization period to determine a proportion of time each occlusion type was identified. The proportion of time was multiplied with the cost heuristic to determine an effective cost heuristic for the calculation method 220 and the calculation method 250. The results are summarized below in Table 1.

TABLE 1

| Occlusion Type | Proportion | Cost Heuristic (Calculation Method 220) | Cost Heuristic (Calculation Method 250) | Effective Cost Heuristic (Calculation Method 220) | Effective Cost Heuristic (Calculation Method 220) |
|---|---|---|---|---|---|
| Split Occlusion | 0.03 | 2 | 4 | 0.06 | 0.12 |
| Partial Occlusion | 0.11 | 3 | 3 | 0.33 | 0.33 |

TABLE 1-continued

| Occlusion Type | Proportion | Cost Heuristic (Calculation Method 220) | Cost Heuristic (Calculation Method 250) | Effective Cost Heuristic (Calculation Method 220) | Effective Cost Heuristic (Calculation Method 220) |
|---|---|---|---|---|---|
| Full Occlusion | 0.06 | 4 | 2 | 0.24 | 0.12 |
| Full Occlusion (early) | 0.1 | 2 | 2 | 0.2 | 0.2 |
| No Occlusion | 0.2 | 4 | 4 | 0.8 | 0.8 |
| No Occlusion (early) | 0.5 | 2 | 4 | 1 | 2 |
| Intersecting Split Occlusion | 0 | 4 | 5 | 0 | 0 |
| Intersection Partial Occlusion | 0 | 5 | 4 | 0 | 0 |
| Total | 1 | 26 | 28 | 2.63 | 3.57 |

As is shown in Table 1, the calculation method 220 reduced computational cost compared to calculation method 250. Specifically, calculation method 220 demonstrated an effective cost heuristic of about 2.63 occlusion calculations per occlusion/feature pair compared to an effective cost heuristic of about 3.57 occlusion calculations per occlusion/feature pair for calculation method 250. It is noted that, in environments with a different proportion mix of occlusion types, the calculation method 250 can be performed more efficiently. Accordingly, the effective cost heuristic can be utilized to customize the embodiments described herein to any particular industrial facility 100.

It should now be understood that the embodiments described herein relate to systems, methods, and industrial vehicles that can perform localization and navigation utilizing visible features and excluding occluded features. Specifically, the embodiments described herein can dynamically update the visibility of features based upon the current position of a sensor of an industrial vehicle. Accordingly, the localization and navigation functions can operate compare a subset of map data to the features that are likely to be detected by the sensor. The accuracy of the localization and navigation functions can be improved by reducing the number of possible mismatches between map data and occluded features. Moreover, the processing time of the localization and navigation functions can be improved by eliminating occluded features from consideration, which can reduce the amount of time that the localization and navigation functions need to converge upon a solution.

It is noted that the term "substantially" is utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

Furthermore, it is noted that directional references such as, for example, X-coordinates, Y-coordinates, Z-coordinates, and the like have been provided for clarity and without limitation. Specifically, it is noted embodiments have been described herein with reference to a two-dimensional coordinate system. Any description with respect to a coordinate system has been provided for clarity and not for limitation. Thus, the embodiments described herein may be extended to higher or lower order coordinate systems by making corresponding changes to the provided coordinate system.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter. Additionally, it is noted that the phrase "one or more processors execute machine readable instructions to" is utilized in the claims as an open-ended transition, such that the term "to," as used in the quoted phrase, is analogous to the term "comprising."

What is claimed is:

1. An industrial vehicle comprising an Environmental Based Localization (EBL) sensor communicatively coupled to one or more processors, wherein the EBL sensor detects objects within a field of view and the one or more processors execute machine readable instructions to:
   access a feature set and an occlusion set that are associated with an industrial facility, wherein the feature set represents objects within the industrial facility that are within the field of view of the EBL sensor and the occlusion set represents objects within the industrial facility that obstruct or prevent the EBL sensor from detecting objects within the field of view;
   provide a location of a sensor origin of the EBL sensor with respect to the industrial facility;
   determine an occlusion path that intersects a detectable occlusion of the occlusion set and the sensor origin of the EBL sensor;
   determine a feature intersection of the occlusion path, wherein the feature intersection is located on a detectable feature of the feature set or a projection of the detectable feature of the feature set;
   classify the detectable feature as an occluded detectable feature based at least in part upon the location of the feature intersection; and
   navigate the industrial vehicle through the industrial facility utilizing the feature set exclusive of the occluded detectable feature.

2. The industrial vehicle of claim 1, wherein the detectable feature of the feature set corresponds to a feature of the industrial facility that is within the field of view of the EBL sensor.

3. The industrial vehicle of claim 1, wherein the detectable occlusion of the occlusion set corresponds to an occlusion of the industrial facility that is within the field of view of the EBL sensor.

4. The industrial vehicle of claim 3, wherein the occlusion of the industrial facility truncates the field of view of the EBL sensor into a truncated field of view, and wherein the occluded detectable feature corresponds to a feature of the industrial facility that is within the field of view of the EBL sensor and outside of the truncated field of view of the EBL sensor.

5. The industrial vehicle of claim 1, wherein the occlusion path intersects the detectable occlusion of the occlusion set at a start point or an end point, and wherein the one or more processors execute the machine readable instructions to:
    determine an order of the feature intersection, the start point or the end point of the detectable occlusion, and the sensor origin of the EBL sensor along the occlusion path, wherein the detectable feature is classified as the occluded detectable feature based at least in part upon the order.

6. The industrial vehicle of claim 5, wherein the one or more processors execute the machine readable instructions to:
    determine a feature path that intersects the detectable feature of the feature set and the sensor origin of the EBL sensor;
    determine an intersection between the feature path and the detectable occlusion of the occlusion set, wherein the detectable feature is classified as the occluded detectable feature based at least in part upon the intersection.

7. The industrial vehicle of claim 6, wherein the order is determined prior to the intersection being determined.

8. The industrial vehicle of claim 1, wherein the one or more processors execute the machine readable instructions to:
    determine a first feature path that intersects a start point of the detectable feature of the feature set and the sensor origin of the EBL sensor;
    determine a second feature path that intersects an end point of the detectable feature of the feature set and the sensor origin of the EBL sensor;
    determine that a point of the detectable occlusion is inside, when the point of the of the detectable occlusion is bounded by an area demarcated by the detectable feature of the feature set, the first feature path and the second feature path, and wherein the detectable feature is classified as the occluded detectable feature based at least in part upon the point of the detectable occlusion being determined inside.

9. The industrial vehicle of claim 8, wherein the one or more processors execute the machine readable instructions to:
    determine an intersection between the first feature path and the detectable occlusion of the occlusion set, wherein the detectable feature is classified as the occluded detectable feature based at least in part upon the intersection.

10. The industrial vehicle of claim 9, wherein the point of the detectable occlusion is determined inside prior to the intersection being determined.

11. The industrial vehicle of claim 9, wherein the intersection is determined prior to the point of the detectable occlusion being determined inside.

12. The industrial vehicle of claim 8, wherein the point of the detectable occlusion is a start point of the detectable occlusion, or an end point of the detectable occlusion.

13. The industrial vehicle of claim 8, wherein the occlusion path intersects the detectable occlusion of the occlusion set at a start point or an end point, and wherein the one or more processors execute the machine readable instructions to:
    determine an order of the feature intersection, the start point or the end point of the detectable occlusion, and the sensor origin of the EBL sensor along the occlusion path, wherein the detectable feature is classified as the occluded detectable feature based at least in part upon the order.

14. The industrial vehicle of claim 13, wherein the order is determined prior to the point of the detectable occlusion being determined inside.

15. The industrial vehicle of claim 1, wherein the detectable feature is classified as the occluded detectable feature according to occlusion calculations that are organized using a cost heuristic.

16. The industrial vehicle of claim 1, wherein the industrial vehicle is configured as an automated guided vehicle.

17. The industrial vehicle of claim 1, wherein the industrial facility is mapped to a two dimensional model.

18. The industrial vehicle of claim 1, wherein the EBL sensor comprises multiple sensors.

* * * * *